US012489497B2

(12) United States Patent
Raghavan et al.

(10) Patent No.: US 12,489,497 B2
(45) Date of Patent: Dec. 2, 2025

(54) TECHNIQUES FOR BEAMFORMING REPORTING USING ACTIVE INTELLIGENT REFLECTIVE SURFACE EMULATIONS WITHIN A USER EQUIPMENT

(71) Applicant: QUALCOMM Incorporated, San Diego, CA (US)

(72) Inventors: Vasanthan Raghavan, West Windsor Township, NJ (US); Tao Luo, San Diego, CA (US); Mohammad Ali Tassoudji, San Diego, CA (US)

( * ) Notice: Subject to any disclaimer, the term of this patent is extended or adjusted under 35 U.S.C. 154(b) by 428 days.

(21) Appl. No.: 18/148,686

(22) Filed: Dec. 30, 2022

(65) Prior Publication Data

US 2024/0223249 A1 Jul. 4, 2024

(51) Int. Cl.
*H04B 7/06* (2006.01)
*H04W 24/10* (2009.01)

(52) U.S. Cl.
CPC ......... *H04B 7/0617* (2013.01); *H04B 7/0626* (2013.01); *H04W 24/10* (2013.01)

(58) Field of Classification Search
CPC .. H04B 7/0617; H04B 7/0626; H04B 7/0695; H04B 7/088; H04W 24/10
See application file for complete search history.

(56) References Cited

U.S. PATENT DOCUMENTS

| 2023/0283105 | A1* | 9/2023 | Lee ......................... H02J 50/20 307/104 |
| 2024/0171356 | A1* | 5/2024 | Zhang ................. H04W 72/231 |
| 2024/0388326 | A1* | 11/2024 | Haghighat ......... H04B 7/04013 |
| 2024/0388327 | A1* | 11/2024 | Kim .................... H04B 7/06952 |
| 2024/0405845 | A1* | 12/2024 | Huang ............... H04B 7/06968 |
| 2025/0105527 | A1* | 3/2025 | Rossanese ............... H01Q 3/46 |

* cited by examiner

*Primary Examiner* — Deepa Belur

(57) ABSTRACT

Methods, systems, and devices for wireless communications are described. A first wireless device may receive control signaling indicating a channel state information reference signal-resource indicator (CRI) for beam reporting, and receive a set of channel state information reference signals (CSI-RSs) in accordance with the CRI. The first wireless device may transmit a beam report indicating a first and second beamforming configurations associated with the CRI, where the first beamforming configuration is associated with an antenna module at the first wireless device, and where the second beamforming configuration is associated with the antenna module and one or more passive devices configured to reflect signal energy to or from the antenna module. The first wireless device may then communicate one or more messages with the second wireless device in accordance with the first beamforming configuration, the second beamforming configuration, or both.

30 Claims, 16 Drawing Sheets

Beamforming Configuration 410-a
(Freespace/Non-Obstructed)

Beamforming Configuration 410-b
(Obstructed)

TECHNIQUES FOR BEAMFORMING REPORTING USING ACTIVE INTELLIGENT REFLECTIVE SURFACE EMULATIONS WITHIN A USER EQUIPMENT

FIELD OF TECHNOLOGY

The following relates to wireless communications, including techniques for beamforming reporting using active intelligent reflective surface (IRS) configurations/emulations within a user equipment (UE).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

Some UEs may use beamforming to focus signal energy in different directions. Such beams may be used to help improve link quality by steering signal energy that includes data communicated via a wireless channel between a UE and another device.

SUMMARY

The described techniques relate to improved methods, systems, devices, and apparatuses that support techniques for beamforming reporting using active intelligent reflective surface (IRS) configurations/emulations within a user equipment (UE). Generally, aspects of the present disclosure are directed to signaling that enables wireless devices (e.g., UEs) to report multiple beamforming configurations for a single channel state information-reference signal (CSI-RS) resource indicator (CRI), including beamforming configurations formed using passive devices such as intelligent reflective surfaces (IRS). For example, a UE may be configured with a CRI for beam reporting, and may receive CSI-RSs using multiple beamforming configurations. In particular, the UE may receive the CSI-RSs using beamforming configurations formed using antenna modules and passive devices such as IRSs equipped within the UE. In this example, the UE may transmit a beam report indicating multiple beamforming configurations associated with the CRI. For instance, the beam report may indicate a first beamforming configuration formed using only antenna modules (e.g., beamforming configuration associated with "freespace" or an "unobstructed" state), and a second beamforming configuration formed using both antenna modules and passive devices (e.g., beamforming configuration associated with an "obstructed" state). The UE may then communicate with the network using the first and/or second beamforming configuration.

A method for wireless communication at a first wireless device is described. The method may include receiving, from a second wireless device, control signaling indicating a CRI for beam reporting, receiving a set of multiple CSI-RSs in accordance with the CRI, transmitting, to the second wireless device based on receiving the set of multiple CSI-RSs, a beam report indicating a first beamforming configuration and a second beamforming configuration associated with the CRI, where the first beamforming configuration is associated with at least one antenna module at the first wireless device, and where the second beamforming configuration is associated with the at least one antenna module and one or more passive devices configured to reflect signal energy to or from the at least one antenna module, and communicating one or more messages with the second wireless device in accordance with the first beamforming configuration, the second beamforming configuration, or both.

An apparatus for wireless communication at a first wireless device is described. The apparatus may include a processor, memory coupled with the processor, and instructions stored in the memory. The instructions may be executable by the processor to cause the apparatus to receive, from a second wireless device, control signaling indicating a CRI for beam reporting, receive a set of multiple CSI-RSs in accordance with the CRI, transmit, to the second wireless device based on receiving the set of multiple CSI-RSs, a beam report indicating a first beamforming configuration and a second beamforming configuration associated with the CRI, where the first beamforming configuration is associated with at least one antenna module at the first wireless device, and where the second beamforming configuration is associated with the at least one antenna module and one or more passive devices configured to reflect signal energy to or from the at least one antenna module, and communicate one or more messages with the second wireless device in accordance with the first beamforming configuration, the second beamforming configuration, or both.

Another apparatus for wireless communication at a first wireless device is described. The apparatus may include means for receiving, from a second wireless device, control signaling indicating a CRI for beam reporting, means for receiving a set of multiple CSI-RSs in accordance with the CRI, means for transmitting, to the second wireless device based on receiving the set of multiple CSI-RSs, a beam report indicating a first beamforming configuration and a second beamforming configuration associated with the CRI, where the first beamforming configuration is associated with at least one antenna module at the first wireless device, and where the second beamforming configuration is associated with the at least one antenna module and one or more passive devices configured to reflect signal energy to or from the at least one antenna module, and means for communicating one or more messages with the second wireless device in accordance with the first beamforming configuration, the second beamforming configuration, or both.

A non-transitory computer-readable medium storing code for wireless communication at a first wireless device is described. The code may include instructions executable by a processor to receive, from a second wireless device, control signaling indicating a CRI for beam reporting, receive a set of multiple CSI-RSs in accordance with the CRI, transmit, to the second wireless device based on receiving the set of multiple CSI-RSs, a beam report indicating a first beamforming configuration and a second beamforming configuration associated with the CRI, where the first beamforming configuration is associated with at least one antenna module at the first wireless device, and where the second beamforming configuration is associated with the at least one antenna module and one or more passive devices configured to reflect signal energy to or from the at least one antenna module, and communicate one or more messages with the second wireless device in accordance with the first beamforming configuration, the second beamforming configuration, or both.

Some examples of the method, apparatuses, and non-transitory computer-readable medium described herein may further include operations, features, means, or instructions for transmitting, to the second wireless device, capability signaling indicating a capability of the first wireless device to apply one or more beamforming configurations using the one or more passive devices, where receiving the control signaling, transmitting the beam report indicating the first beamforming configuration and the second beamforming configuration, or both, may be based on the capability signaling.

Some examples of the method, apparatuses, and non-transitory computer-readable medium described herein may further include operations, features, means, or instructions for receiving, via the control signaling, an indication for the first wireless device to report a quantity of beamforming configurations associated with the CRI, where transmitting the beam report indicating the first beamforming configuration and the second beamforming configuration may be based on the indication.

Some examples of the method, apparatuses, and non-transitory computer-readable medium described herein may further include operations, features, means, or instructions for transmitting, to the second wireless device via the beam report, an additional message, or both, an indication of the first beamforming configuration or the second beamforming configuration, where the one or more messages may be beamformed in accordance with the indication.

Some examples of the method, apparatuses, and non-transitory computer-readable medium described herein may further include operations, features, means, or instructions for performing measurements for the set of multiple CSI-RSs received in accordance with a set of multiple beamforming configurations, where the set of multiple beamforming configurations include at least the first beamforming configuration and the second beamforming configuration, and where the beam report may be based on the measurements.

Some examples of the method, apparatuses, and non-transitory computer-readable medium described herein may further include operations, features, means, or instructions for transmitting, via the beam report, a first indication that the first beamforming configuration may be associated with the at least one antenna module, and a second indication that the second beamforming configuration may be associated with the at least one antenna module and the one or more passive devices.

In some examples of the method, apparatuses, and non-transitory computer-readable medium described herein, the first beamforming configuration may be associated with freespace state of the at least one antenna module and the second beamforming configuration may be associated with a blockage state of the at least one antenna module.

In some examples of the method, apparatuses, and non-transitory computer-readable medium described herein, the one or more passive devices emulate reflective beam properties of an IRS.

In some examples of the method, apparatuses, and non-transitory computer-readable medium described herein, the first wireless device includes a user equipment (UE), an IAB node, or both and the second wireless device includes a network entity.

In some examples of the method, apparatuses, and non-transitory computer-readable medium described herein, the one or more passive devices form at least a part of the at least one antenna module.

A method for wireless communication at a second wireless device is described. The method may include transmitting, to a first wireless device, control signaling indicating a CRI for beam reporting, transmitting a set of multiple CSI-RSs in accordance with the CRI, receiving, from the first wireless device based on transmitting the set of multiple CSI-RSs, a beam report indicating a first beamforming configuration and a second beamforming configuration associated with the CRI, where the first beamforming configuration is associated with at least one antenna module at the first wireless device, and where the second beamforming configuration is associated with the at least one antenna module and one or more passive devices configured to reflect signal energy to or from the at least one antenna module, and communicating one or more messages with the first wireless device in accordance with the first beamforming configuration, the second beamforming configuration, or both.

An apparatus for wireless communication at a second wireless device is described. The apparatus may include a processor, memory coupled with the processor, and instructions stored in the memory. The instructions may be executable by the processor to cause the apparatus to transmit, to a first wireless device, control signaling indicating a CRI for beam reporting, transmit a set of multiple CSI-RSs in accordance with the CRI, receive, from the first wireless device based on transmitting the set of multiple CSI-RSs, a beam report indicating a first beamforming configuration and a second beamforming configuration associated with the CRI, where the first beamforming configuration is associated with at least one antenna module at the first wireless device, and where the second beamforming configuration is associated with the at least one antenna module and one or more passive devices configured to reflect signal energy to or from the at least one antenna module, and communicate one or more messages with the first wireless device in accordance with the first beamforming configuration, the second beamforming configuration, or both.

Another apparatus for wireless communication at a second wireless device is described. The apparatus may include means for transmitting, to a first wireless device, control signaling indicating a CRI for beam reporting, means for transmitting a set of multiple CSI-RSs in accordance with the CRI, means for receiving, from the first wireless device based on transmitting the set of multiple CSI-RSs, a beam report indicating a first beamforming configuration and a second beamforming configuration associated with the CRI, where the first beamforming configuration is associated with at least one antenna module at the first wireless device, and where the second beamforming configuration is associated with the at least one antenna module and one or more passive devices configured to reflect signal energy to or from the at least one antenna module, and means for communicating one or more messages with the first wireless device in accordance with the first beamforming configuration, the second beamforming configuration, or both.

A non-transitory computer-readable medium storing code for wireless communication at a second wireless device is described. The code may include instructions executable by a processor to transmit, to a first wireless device, control signaling indicating a CRI for beam reporting, transmit a set of multiple CSI-RSs in accordance with the CRI, receive, from the first wireless device based on transmitting the set of multiple CSI-RSs, a beam report indicating a first beamforming configuration and a second beamforming configuration associated with the CRI, where the first beamforming configuration is associated with at least one antenna module at the first wireless device, and where the second beamforming configuration is associated with the at least one antenna module and one or more passive devices configured to reflect signal energy to or from the at least one antenna module, and communicate one or more messages with the first wireless device in accordance with the first beamforming configuration, the second beamforming configuration, or both.

Some examples of the method, apparatuses, and non-transitory computer-readable medium described herein may further include operations, features, means, or instructions for receiving, from the first wireless device, capability signaling indicating a capability of the first wireless device to apply one or more beamforming configurations using the one or more passive devices, where transmitting the control signaling, receiving the beam report indicating the first beamforming configuration and the second beamforming configuration, or both, may be based on the capability signaling.

Some examples of the method, apparatuses, and non-transitory computer-readable medium described herein may further include operations, features, means, or instructions for transmitting, via the control signaling, an indication for the first wireless device to report a quantity of beamforming configurations associated with the CRI, where receiving the beam report indicating the first beamforming configuration and the second beamforming configuration may be based on the indication.

Some examples of the method, apparatuses, and non-transitory computer-readable medium described herein may further include operations, features, means, or instructions for receiving, from the first wireless device via the beam report, an additional message, or both, an indication of the first beamforming configuration or the second beamforming configuration, where the one or more messages may be beamformed in accordance with the indication.

Some examples of the method, apparatuses, and non-transitory computer-readable medium described herein may further include operations, features, means, or instructions for receiving, via the beam report, a first indication that the first beamforming configuration may be associated with the at least one antenna module, and a second indication that the second beamforming configuration may be associated with the at least one antenna module and the one or more passive devices.

In some examples of the method, apparatuses, and non-transitory computer-readable medium described herein, the first beamforming configuration may be associated with freespace state of the at least one antenna module and the second beamforming configuration may be associated with a blockage state of the at least one antenna module.

In some examples of the method, apparatuses, and non-transitory computer-readable medium described herein, the one or more passive devices emulate reflective beam properties of an IRS.

In some examples of the method, apparatuses, and non-transitory computer-readable medium described herein, the first wireless device includes a UE, an IAB node, or both and the second wireless device includes a network entity.

In some examples of the method, apparatuses, and non-transitory computer-readable medium described herein, the one or more passive devices form at least a part of the at least one antenna module.

DETAILED DESCRIPTION

Figure 1:
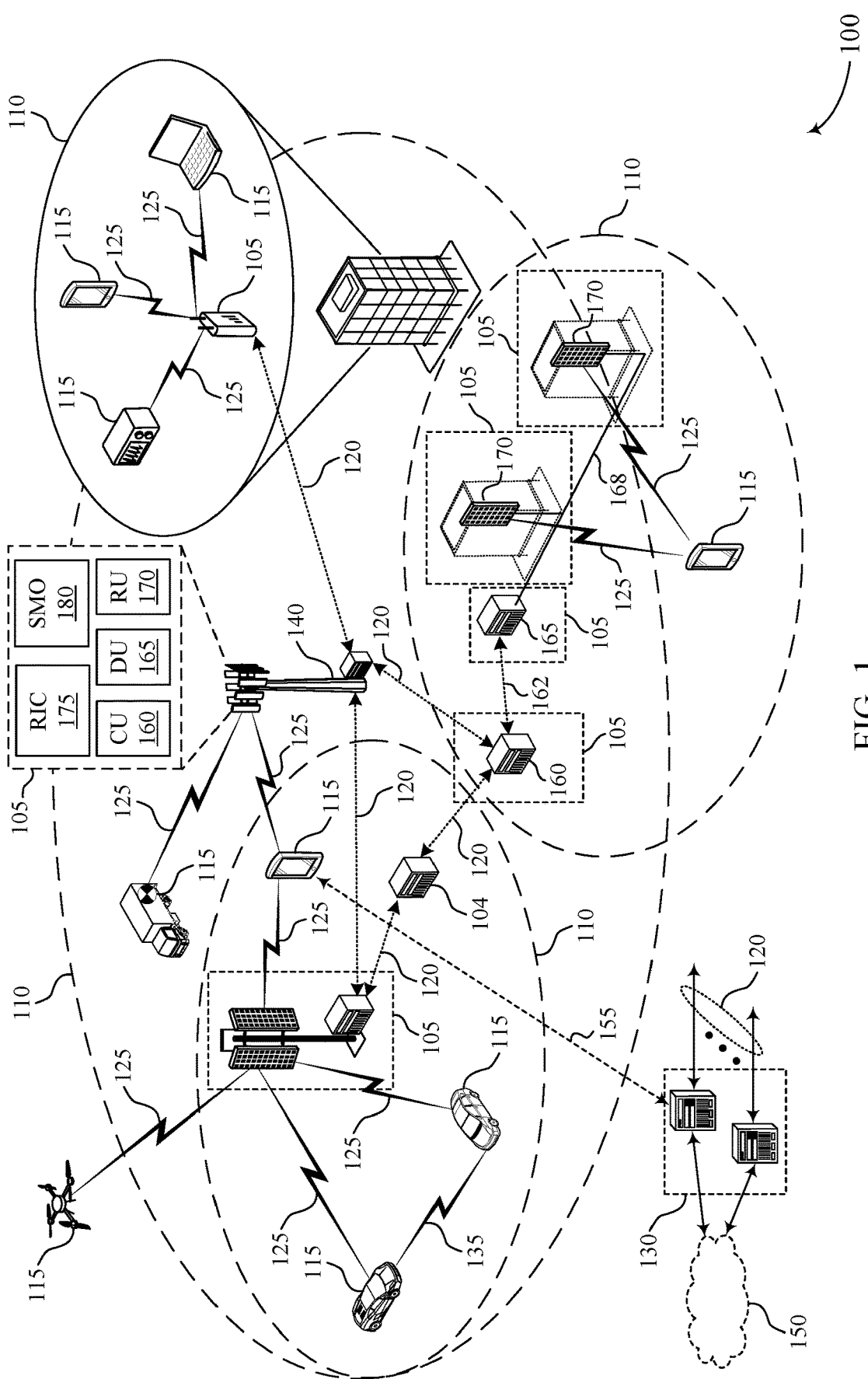
FIG. 1 illustrates an example of a wireless communications system that supports techniques for beamforming reporting using active intelligent reflective surface (IRS) configurations in accordance with one or more aspects of the present disclosure.

Wireless devices, such as user equipments (UEs), may be configured to receive reference signals (e.g., channel state information-reference signals (CSI-RSs)) from the network using different beams or beamforming configurations, and report which beams/beamforming configurations exhibit the best or sufficient performance. However, physical obstructions leading to blockage may negatively affect the performance of certain beams/beamforming configurations.

For example, a user holding their phone (e.g., UE) may inadvertently place their finger over an antenna module used to form a beam, thereby detrimentally affecting the performance of the beam. Some UEs may include passive devices, such as intelligent reflective surfaces (IRSs), that reflect and focus signal energy in different directions, effectively creating different beams at the UE. Such beams formed using passive devices may be used to help improve link quality in cases where antenna modules are otherwise obstructed, such as when a user places their finger over an antenna module. However, current networks generally only allow UEs to be configured with a single CSI-RS resource indicator (CRI), and only enable the UEs to report a single beam/beamforming configuration per CRI. As such, using conventional techniques, UEs may only be able to report beamforming configurations associated with "unobstructed" states (e.g., when the user's finger is not blocking the antenna module), thereby limiting the usefulness of other beamforming configurations formed using passive devices (e.g., beamforming configurations using passive elements when the user's finger is blocking the antenna module).

Accordingly, aspects of the present disclosure are directed to configurations and signaling that enables wireless devices (e.g., UEs) to report multiple beamforming configurations per CRI, including beamforming configurations formed using passive devices such as IRSs. For example, a UE may be configured with a CRI for beam reporting, and may receive CSI-RSs using multiple beamforming configurations. In particular, the UE may receive the CSI-RSs using beamforming configurations formed using antenna modules and passive devices such as IRSs. In this example, the UE may transmit a beam report indicating multiple beamforming configurations associated with the CRI. For instance, the beam report may indicate a first beamforming configuration formed using only antenna modules (e.g., beamforming configuration associated with "freespace" or an "unobstructed" state), and a second beamforming configuration formed using both antenna modules and passive devices (e.g., beamforming configuration associated with an "obstructed" state). The UE may then communicate with the network using the first and/or second beamforming configuration.

In some cases, the network may instruct the UE to report multiple beamforming configurations per CRI, such as based on capability signaling from the UE indicating the UE is able to apply beamforming configurations using passive devices. The UE may be able to report a current state (e.g., obstructed or unobstructed case), and communicate with the network using the respective beamforming configuration that corresponds with the reported obstructed/unobstructed state.

Aspects of the disclosure are initially described in the context of wireless communications systems. Additional aspects of the disclosure are described in the context of an example network architecture, an example foldable state diagram, and an example process flow. Aspects of the disclosure are further illustrated by and described with reference to apparatus diagrams, system diagrams, and flowcharts that relate to techniques for beamforming reporting using active IRS configurations.

FIG. 1 illustrates an example of a wireless communications system 100 that supports techniques for beamforming reporting using active IRS configurations in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support techniques for beamforming reporting using active IRS configurations as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IOT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s = 1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking. Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more sub-bands. The network entity 105 may transmit a reference signal (e.g., a cell-specific reference signal (CRS), a channel state information (CSI) reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), highest signal-to-interference-plus-noise ratio (SINR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

The wireless devices (e.g., UEs 115, network entities 105, IAB nodes, etc.) of the wireless communications system 100 may be configured to support configurations and signaling that enables wireless devices (e.g., UEs 115) to report multiple beamforming configurations per CRI, including beamforming configurations formed using passive devices such as IRSs.

For example, a UE 115 of the wireless communications system 100 may be configured with a CRI for beam reporting (e.g., configured by a network entity 105), and may receive CSI-RSs using multiple beamforming configurations. In particular, the UE 115 may receive the CSI-RSs using beamforming configurations formed using antenna modules and passive devices such as IRSs. In this example, the UE 115 may transmit a beam report to the network entity 105, where the beam report indicates multiple beamforming configurations associated with the CRI. For instance, the beam report may indicate a first beamforming configuration formed using only antenna modules (e.g., beamforming configuration associated with "freespace" or an "unobstructed" state), and a second beamforming configuration formed using both antenna modules and passive devices (e.g., beamforming configuration associated with an "obstructed" state). The UE 115 may then communicate with the network entity 105 using the first and/or second beamforming configuration.

In some cases, the network entity 105 may instruct the UE 115 to report multiple beamforming configurations per CRI, such as based on capability signaling from the UE 115 indicating the UE 115 is able to apply beamforming configurations using passive devices. The UE 115 may be able to report a current state (e.g., obstructed or unobstructed case), and communicate with the network using the respective beamforming configuration that corresponds with the reported obstructed/unobstructed state.

Techniques described herein may enable wireless devices (e.g., UEs 115) to report multiple beams/beamforming configurations to the network, including beamforming configurations formed using antenna modules (e.g., beamforming configurations for a freespace state) and beamforming configurations formed using both antenna modules and passive devices (e.g., beamforming configurations for an obstructed state). In particular, techniques described herein may enable UEs 115 to report multiple beamforming configurations for a single CRI, or to be configured with multiple CRIs to enable the UE 115 to report multiple beamforming configurations. By enabling UEs 115 to report multiple beamforming configurations (e.g., for a single CRI), techniques described herein may enable UEs 115 to report beamforming configurations usable in both obstructed and unobstructed states, thereby increasing the utility of passive devices at the UE 115. Moreover, by enabling UEs 115 to report multiple beamforming configurations, techniques described herein may improve an efficiency and reliability of wireless communications by enabling UEs 115 to switch between beamforming configurations when a reported beamforming configuration becomes obstructed or otherwise experiences performance degradation.

Figure 2:
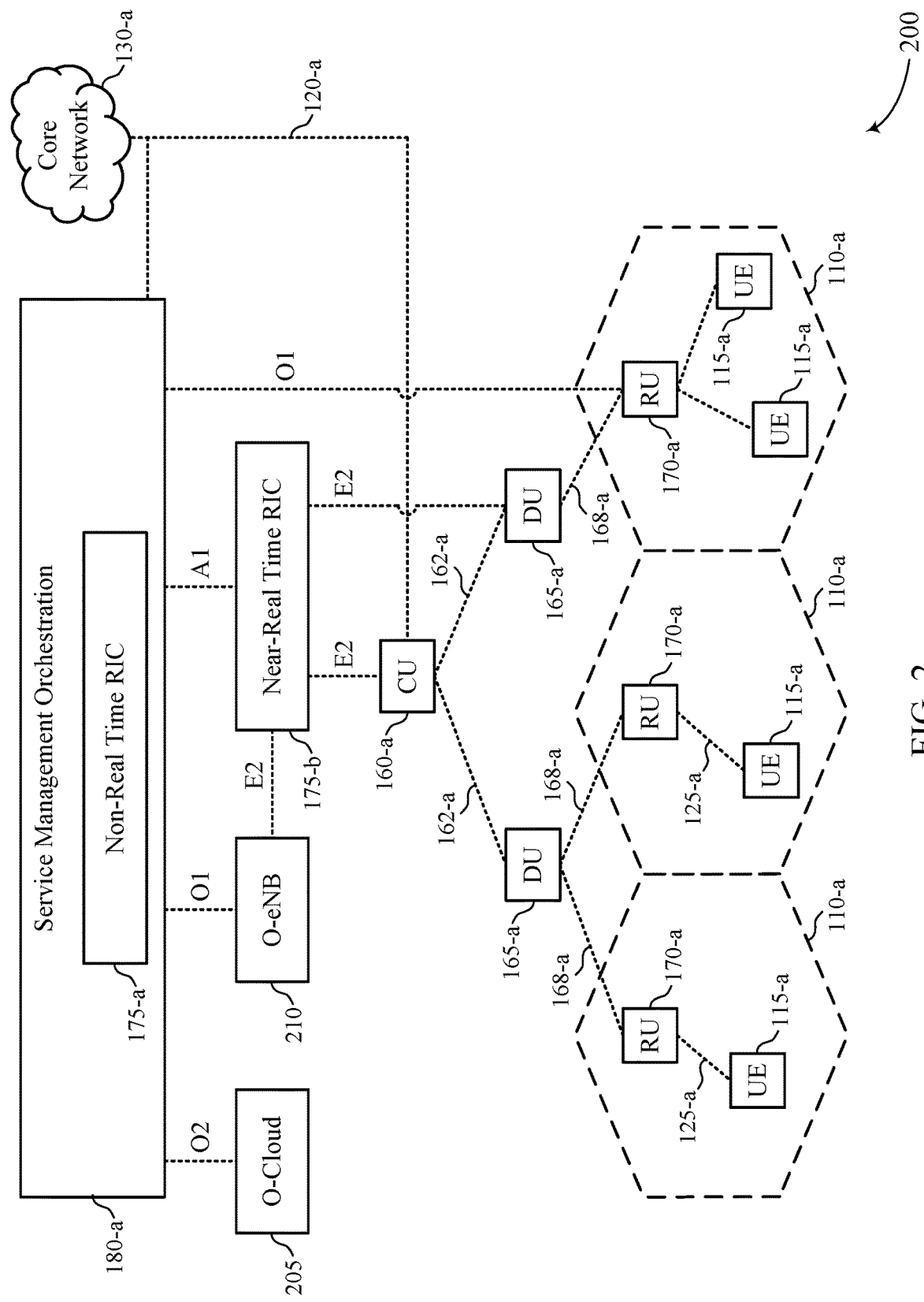
FIG. 2 illustrates an example of a network architecture that supports techniques for beamforming reporting using active IRS configurations in accordance with one or more aspects of the present disclosure.

FIG. 2 illustrates an example of a network architecture 200 (e.g., a disaggregated base station architecture, a disaggregated RAN architecture) that supports techniques for beamforming reporting using active IRS configurations in accordance with one or more aspects of the present disclosure. The network architecture 200 may illustrate an example for implementing one or more aspects of the wireless communications system 100. The network architecture 200 may include one or more CUs 160-a that may communicate directly with a core network 130-a via a backhaul communication link 120-a, or indirectly with the core network 130-a through one or more disaggregated network entities 105 (e.g., a Near-RT RIC 175-b via an E2 link, or a Non-RT RIC 175-a associated with an SMO 180-a (e.g., an SMO Framework), or both). A CU 160-a may communicate with one or more DUs 165-a via respective midhaul communication links 162-a (e.g., an F1 interface). The DUs 165-a may communicate with one or more RUs 170-a via respective fronthaul communication links 168-a. The RUs 170-a may be associated with respective coverage areas 110-a and may communicate with UEs 115-a via one or more communication links 125-a. In some implementations, a UE 115-a may be simultaneously served by multiple RUs 170-a.

Each of the network entities 105 of the network architecture 200 (e.g., CUs 160-a. DUs 165-a. RUs 170-a, Non-RT RICs 175-a, Near-RT RICs 175-b, SMOs 180-a, Open Clouds (O-Clouds) 205, Open eNBs (O-eNBs) 210) may include one or more interfaces or may be coupled with one or more interfaces configured to receive or transmit signals (e.g., data, information) via a wired or wireless transmission medium. Each network entity 105, or an associated processor (e.g., controller) providing instructions to an interface of the network entity 105, may be configured to communicate with one or more of the other network entities 105 via the transmission medium. For example, the network entities 105 may include a wired interface configured to receive or transmit signals over a wired transmission medium to one or more of the other network entities 105. Additionally, or alternatively, the network entities 105 may include a wireless interface, which may include a receiver, a transmitter, or transceiver (e.g., an RF transceiver) configured to receive or transmit signals, or both, over a wireless transmission medium to one or more of the other network entities 105.

In some examples, a CU 160-a may host one or more higher layer control functions. Such control functions may include RRC, PDCP. SDAP, or the like. Each control function may be implemented with an interface configured to communicate signals with other control functions hosted by the CU 160-a. A CU 160-a may be configured to handle user plane functionality (e.g., CU-UP), control plane functionality (e.g., CU-CP), or a combination thereof. In some examples, a CU 160-a may be logically split into one or more CU-UP units and one or more CU-CP units. A CU-UP unit may communicate bidirectionally with the CU-CP unit via an interface, such as an E1 interface when implemented in an O-RAN configuration. A CU 160-a may be implemented to communicate with a DU 165-a, as necessary, for network control and signaling.

A DU 165-a may correspond to a logical unit that includes one or more functions (e.g., base station functions, RAN functions) to control the operation of one or more RUs 170-a. In some examples, a DU 165-a may host, at least partially, one or more of an RLC layer, a MAC layer, and one or more aspects of a PHY layer (e.g., a high PHY layer, such as modules for FEC encoding and decoding, scrambling, modulation and demodulation, or the like) depending, at least in part, on a functional split, such as those defined by the 3rd Generation Partnership Project (3GPP). In some examples, a DU 165-*a* may further host one or more low PHY layers. Each layer may be implemented with an interface configured to communicate signals with other layers hosted by the DU 165-*a*, or with control functions hosted by a CU 160-*a*.

In some examples, lower-layer functionality may be implemented by one or more RUs 170-*a*. For example, an RU 170-*a*, controlled by a DU 165-*a*, may correspond to a logical node that hosts RF processing functions, or low-PHY layer functions (e.g., performing fast Fourier transform (FFT), inverse FFT (iFFT), digital beamforming, physical random access channel (PRACH) extraction and filtering, or the like), or both, based at least in part on the functional split, such as a lower-layer functional split. In such an architecture, an RU 170-*a* may be implemented to handle over the air (OTA) communication with one or more UEs 115-*a*. In some implementations, real-time and non-real-time aspects of control and user plane communication with the RU(s) 170-*a* may be controlled by the corresponding DU 165-*a*. In some examples, such a configuration may enable a DU 165-*a* and a CU 160-*a* to be implemented in a cloud-based RAN architecture, such as a vRAN architecture.

The SMO 180-*a* may be configured to support RAN deployment and provisioning of non-virtualized and virtualized network entities 105. For non-virtualized network entities 105, the SMO 180-*a* may be configured to support the deployment of dedicated physical resources for RAN coverage requirements which may be managed via an operations and maintenance interface (e.g., an O1 interface). For virtualized network entities 105, the SMO 180-*a* may be configured to interact with a cloud computing platform (e.g., an O-Cloud 205) to perform network entity life cycle management (e.g., to instantiate virtualized network entities 105) via a cloud computing platform interface (e.g., an O2 interface). Such virtualized network entities 105 can include, but are not limited to, CUs 160-*a*, DUs 165-*a*, RUs 170-*a*, and Near-RT RICs 175-*b*. In some implementations, the SMO 180-*a* may communicate with components configured in accordance with a 4G RAN (e.g., via an O1 interface). Additionally, or alternatively, in some implementations, the SMO 180-*a* may communicate directly with one or more RUs 170-*a* via an O1 interface. The SMO 180-*a* also may include a Non-RT RIC 175-*a* configured to support functionality of the SMO 180-*a*.

The Non-RT RIC 175-*a* may be configured to include a logical function that enables non-real-time control and optimization of RAN elements and resources, Artificial Intelligence (AI) or Machine Learning (ML) workflows including model training and updates, or policy-based guidance of applications/features in the Near-RT RIC 175-*b*. The Non-RT RIC 175-*a* may be coupled to or communicate with (e.g., via an A1 interface) the Near-RT RIC 175-*b*. The Near-RT RIC 175-*b* may be configured to include a logical function that enables near-real-time control and optimization of RAN elements and resources via data collection and actions over an interface (e.g., via an E2 interface) connecting one or more CUs 160-*a*, one or more DUs 165-*a*, or both, as well as an O-eNB 210, with the Near-RT RIC 175-*b*.

In some examples, to generate AI/ML models to be deployed in the Near-RT RIC 175-*b*, the Non-RT RIC 175-*a* may receive parameters or external enrichment information from external servers. Such information may be utilized by the Near-RT RIC 175-*b* and may be received at the SMO 180-*a* or the Non-RT RIC 175-*a* from non-network data sources or from network functions. In some examples, the Non-RT RIC 175-*a* or the Near-RT RIC 175-*b* may be configured to tune RAN behavior or performance. For example, the Non-RT RIC 175-*a* may monitor long-term trends and patterns for performance and employ AI or ML models to perform corrective actions through the SMO 180-*a* (e.g., reconfiguration via O1) or via generation of RAN management policies (e.g., A1 policies).

Figure 3:
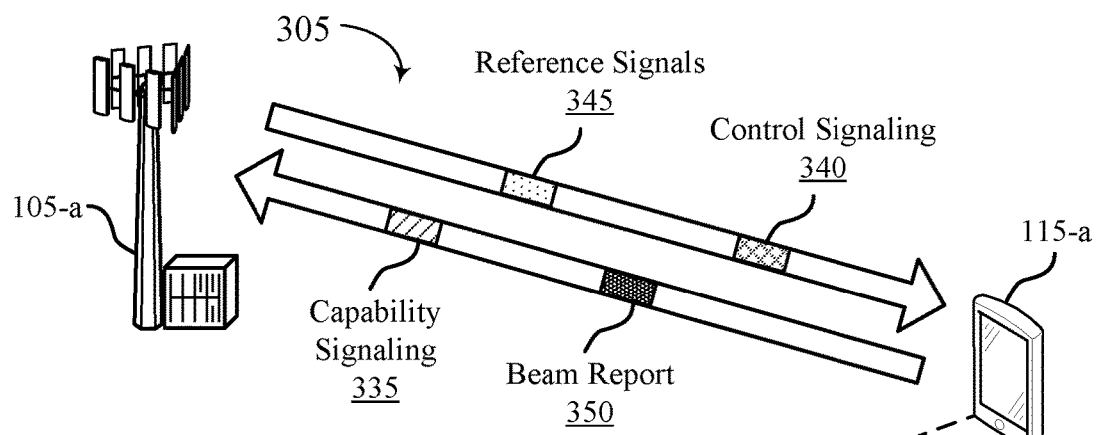
FIG. 3 illustrates an example of a wireless communications system that supports techniques for beamforming reporting using active IRS configurations in accordance with one or more aspects of the present disclosure.
Figure 3:
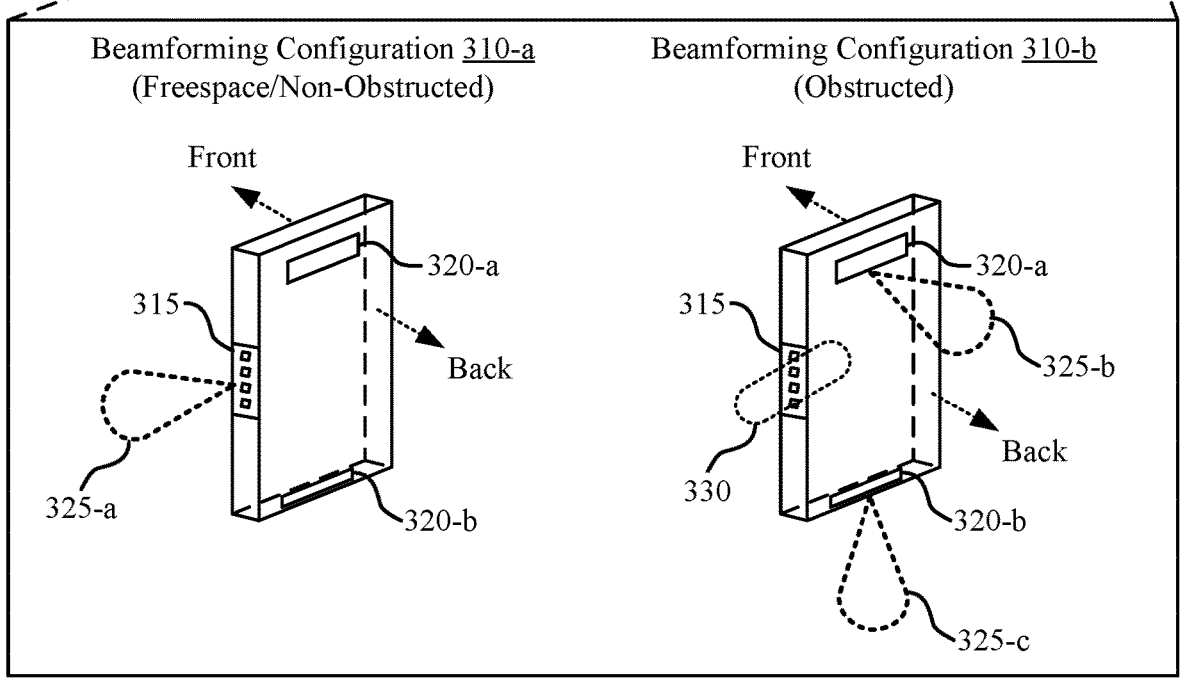

FIG. 3 illustrates an example of a wireless communications system 300 that supports techniques for beamforming reporting using active IRS configurations in accordance with one or more aspects of the present disclosure. Aspects of the wireless communications system 300 may implement, or be implemented by, aspects of wireless communications system 100, the network architecture 200, or both. For example, the wireless communications system 300 illustrates signaling that enables a UE 115-*a* to report multiple beamforming configurations to the network, including beamforming configurations formed using passive devices, as described previously herein.

The wireless communications system 300 may include a UE 115 *a* and a network entity 105-*a*, which may be examples of UEs 115 and network entities 105 as described with reference to FIGS. 1-2. In some aspects, the UE 115-*a* may communicate with the network entity 105-*a* via a communication link 305. In some cases, the communication link 305 may include an example of an access link (e.g., a Uu link). The communication link 305 may a include bi-directional link that can include both uplink and downlink communication. For example, the UE 115-*a* may transmit uplink transmissions, such as uplink control signals or uplink data signals, to the network entity 105-*a* using the communication links 305, and the network entity 105-*a* may transmit downlink transmissions, such as downlink control signals or downlink data signals, to the UE 115-*a* using the communication link 305.

In some aspects, the UE 115-*a* may include one or more antenna modules 315 that each include a set of antenna elements that are configured to facilitate wireless communications. As noted previously herein, some wireless devices may support passive devices 320-*a*, 320-*b* that are configured to reflect signal energy to or from the one or more antenna modules 315. In some aspects, passive devices 320 may include (or otherwise emulate properties of) IRSs, reconfigurable intelligent surfaces (RISs), and the like, that are configured to reflect signals received at (e.g., incident upon) the passive devices 320. In additional or alternative implementations, the passive devices 320 may be included within or form part of one or more antenna modules 315.

In some aspects, the passive devices 320 may include or be made of different materials that exhibit different dielectric properties. For example, the passive devices 320 may include coatings or other surfaces that exhibit a varying dielectric/conductivity property as compared to other surfaces/coatings of the UE 115-*a*. These materials of the passive devices 320 may be "passive" in freespace, but may be configured to reflect energy to distinct parts of the sphere (e.g., to distinct parts of the UE 115-*a*) in the presence of a hand, body, finger 330, etc. positioned near/around the UE 115-*a*. The precise direction(s) in which signal energy gets reflected to/from the passive devices 320 (relative to the center or an axis of the UE 115-*a*) may depend on a location of the passive devices 320, properties of the material(s) of the passive devices 320, and/or associated hand/body effects of the user holding the UE 115-a. As will be described in further detail herein, the UEs 115-a may be equipped with one or more passive devices 320 to improve spherical coverage performance of the UE 320 with or without hand/body effects.

The passive devices 320 (e.g., IRSs, RISs) may be used to help improve link diversity in certain frequency bands (e.g., Frequency Range (FR) 2 (FR2), as well as FR3, FR4, FR5, etc.), and to improve a density of wireless devices in some networks. In some aspects, passive devices 320 may be configured to selectively adjust a voltage applied to one or more varactors, PIN diodes, or other reflective/refractive surfaces in order to adjust the phase response corresponding (and therefore the reflection angle) of impinging waves or signals. Through the appropriate adjustment of the phase response, an impinging signal/wave can be reflected by the passive device 320 off in a different outgoing direction. In some cases, the cost and area associated with a varactor/PIN diode can complicate the implementation of passive devices 320, particularly in some frequency ranges such as mmW frequency ranges.

In some aspects, the UE 115-a may be configured to communicate (e.g., via the communication link 305) using one or more beams or beamforming configurations 310. In some aspects, the UE 115-a may be configured to form respective beams/beamforming configurations 310 using one or more antenna modules 315, one or more passive devices 320, or both. In this regard, for the purposes of the present disclosure, the terms "beams" and "beamforming configurations 310" may be used to refer to configurations of antenna elements (e.g., antenna modules 315), passive devices 320 (e.g., IRSs), or both, that are used to focus signal energy to/from the network entity 105-a to facilitate beamformed communications.

In some cases, RIS-like or IRS-like functionality can be realized with a passive device 320 leading to an "active RIS" configuration. In other words, passive devices 320 may be used to form or generate additional beamforming configurations 310 that are used to perform wireless communications at the UE 115-a. In such cases, the passive device 320 (e.g., passive object, such as an IRS or RIS) may reflect signal energy with/without the presence of hand/other objects in the vicinity of the UE 115-a assisting in increasing signal capture by the device.

For example, as shown in FIG. 3, the UE 115-a may include at least one antenna module 315 including one or more antenna elements, a first passive device 320-a (e.g., first IRS/RIS), and a second passive device 320-b (e.g., second IRS/RIS). In some aspects, the passive devices 320-a, 320-b (e.g., passive components, passive materials) may exhibit the same or different dielectric/reflective properties compared to one another, and/or compared to other components/materials of the UE 115-a. The passive devices 320 may include passive materials that are not antenna modules, and may not radiate in freespace (e.g., passive devices 320 do not transmit/receive signals on their own). The antenna module 315 and passive devices 320 may be used to form or generate beams/beamforming configurations 310 that are used to perform wireless communications.

For instance, the first beamforming configuration 310-a illustrates an example in which the antenna module 315 is operating in freespace, or is not otherwise obstructed. In such cases, the antenna module 315 may be used to transmit/receive signals within a first coverage region 325-a (e.g., first beam) associated with the first beamforming configuration 310-a. In other words, the UE 115-a may communicate with the network entity 105-a in accordance with the first beamforming configuration 310-a (e.g., transmit/receive signals within the first coverage region 325-a) in cases where the antenna module 315 is not blocked or obstructed.

Comparatively, referring to the second beamforming configuration 310-b, the antenna module 315 may be blocked or obstructed, such as when a user places their finger 330 over the antenna module 315. In this case, the finger 330 may reflect signal energy to different parts of the sphere (e.g., to different locations relative to the UE 115-a), where the precise direction of the reflection may depend on the location of the antenna module 315, the location/positioning of the finger 330, etc. In such cases, the passive devices 320-a, 320-b may be configured to reflect signal energy to/from the antenna module 315 to transmit/receive signals within additional coverage regions 325-b, 325-c (e.g., additional beams) of the second beamforming configuration 310-b. That is, the first passive device 320-a may reflect signals received within the second coverage region 325-b off the finger 330 to the antenna module 315. Moreover, signals transmitted by the antenna module 315 may be reflected off the finger 330 and reflected by the first passive device 320-a within the second coverage region 325-b. Similarly, the second passive device 320-b may reflect signal energy within the coverage region 325-c to/from the antenna module 315 (off the finger 330).

In this regard, in cases where a user's hand/finger 330 is near or obstructing the antenna module 315, the coverage regions 325 at the UE 115-a may be enhanced by the presence of passive materials (e.g., passive devices 320) that reflect signal energy to/from the respective coverage regions 325-b, 325-c of the second beamforming configuration 310-b. In this regard, even though the passive devices 320 may be considered to be passive in the sense that they do not transmit/receive signals in freespace, the passive devices 320 may be used to effectively generate "active RIS" configurations (such as the second beamforming configuration 310-b) when the UE 115-a is in an obstructed state. In such cases, the passive devices 320 may act as mini IRS nodes which reshape the directivity of beams used for wireless communications at the UE 115-a. As such, the use of passive devices 320 may improve link diversity, and may enable the UE 115-a to maintain a sufficient performance of wireless signals even in cases where the antenna module 315 becomes blocked or obstructed.

As described previously herein, in some wireless communications systems, UEs 115 may be configured to receive reference signals (e.g., CSI-RSs) from the network using different beams or beamforming configurations 310, and report which beams/beamforming configurations 310 exhibit the best or sufficient performance. Physical obstructions, such as the user's finger 330 illustrated in FIG. 3, may negatively affect the performance of certain beams/beamforming configurations. For example, a user holding their phone (e.g., UE) may inadvertently place their finger 330 over the antenna module 315 used to form a beam, thereby detrimentally affecting the performance of the beam.

However, some networks generally only allow UEs 115 to be configured with a single CRI, and only enable the UEs 115 to report a single beam/beamforming configuration 310 per CRI. For example, referring to FIG. 3, according to some conventional techniques, the network entity 105-a may configure the UE 115-a with a single CRI, and the UE 115-a may be configured to report a single beamforming configuration 310 associated with the CRI. In this example, the first beamforming configuration 310-a may exhibit the highest performance when the UE 115-a is operating in freespace, and the UE 115-a may therefore report the first beamforming configuration 310-a for the CRI. In such cases, if the user subsequently places their finger 330 over the antenna module 315, the performance of the first beamforming configuration 310-a may degrade, and it may be unclear which beamforming configuration 310 should be used since the UE 115-a only reported the first beamforming configuration 310-a for the CRI. the wireless devices may be un Stated differently, using conventional techniques, UEs 115 may only be able to report beamforming configurations 310 associated with "unobstructed" states (e.g., when the user's finger 330 is not blocking the antenna module 315), thereby limiting the usefulness of other beamforming configurations 310 formed using passive devices 320 (e.g., the second beamforming configuration 310-b using passive devices 320 when the user's finger 330 is blocking the antenna module 315).

Accordingly, the UE 115-a and the network entity 105-a of the wireless communications system 300 may support configurations and signaling that enables the UE 115-a to report multiple beamforming configurations 310 per CRI, including beamforming configurations 310 formed using passive devices 320 such as IRSs. In other words, aspects of the present disclosure may enable the UE 115-a to report beamforming configurations 310 associated with freespace as well as beamforming configurations 310 associated with obstructed states. As such, techniques described herein may enable beam reporting for "active RIS" configurations that allow the UE 115-a to collect signal energy across different spatial/coverage regions 325 by directing signals to/from the antenna module 315 that is selected and rendered active at the UE 115-a. Collecting signal energy from different directions via the use of "active RIS" configurations may enable the network entity 105-a to communicate with the UE 115-a using multiple beams or beamforming configurations 310, such as based on the state of the UE 115-a (e.g., based on whether the UE 115-a is in a freespace/unobstructed state, or in an obstructed state).

For example, referring to FIG. 3, the UE 115-a may transmit, to the network entity 105-a, capability signaling 335 indicating a capability of the UE 115-a to apply one or more beamforming configurations 310 using one or more passive devices 320 at the UE 115-a. In other words, the capability signaling 335 may indicate that the UE 115-a includes one or more passive devices 320 that may be used to form beams/beamforming configurations 310 at the UE 115-a, such as in cases were antenna modules 315 at the UE 115-a become obstructed. The passive devices 320 may include (or otherwise emulate properties of) an IRS, RIS, and the like.

The UE 115-b may receive, from the network entity 105-a, control signaling 340 (e.g., RRC, MAC-CE, system information block (SIB)) indicating a CRI for beam reporting. The control signaling 340 may indicate a set of resources that are usable for communicating reference signals 345 (e.g., CSI-RSs) associated with the CRI.

In some aspects, the control signaling 340 may indicate for the UE 115-a to report a quantity of beamforming configurations 310 associated with the CRI. In other words, the network entity 105-a may configure the UE 115-a to report multiple (e.g., K quantity) beamforming configurations 310 for the single CRI, where the value of K may be configured or indicated via the network (e.g., via the control signaling 340 or additional control signaling 340). Stated differently, instead of indicating only the best beam/beamforming configuration 310 for the CRI, the network entity 105-a may enable the UE 115-a to report the best set of K beams/beamforming configurations 310 that the network entity 105-a can use to further enhance reception. Such signaling/feedback may be considered as an enhanced P2 procedure and creation of a "multi-beam" in response to device enhancement.

Subsequently, the network entity 105-a may transmit one or more reference signals 345, such as CSI-RSs. In particular, the network entity 105-a may transmit the CSI-RSs in accordance with the CRI indicated via the control signaling 340 (e.g., within resources configured via the control signaling 340).

The UE 115-a may be configured to receive the reference signals 345 using multiple different beams/beamforming configurations 310 at the UE 115-a, including beamforming configurations 310 associated with antenna modules 315, passive devices 320, or both. For example, as shown in FIG. 3, the UE 115-a may be configured to receive CSI-RSs using the first beamforming configuration 310-a associated with the antenna module 315, and the second beamforming configuration 310-b associated with the antenna module 315 and the passive devices 320 at the UE 115-a. In this example, the first beamforming configuration 310-a may be associated with freespace state of the antenna module 315, and the second beamforming configuration 310-b may be associated with a blockage or obstructed state of the antenna module 315.

In some aspects, the UE 115-a may perform measurements on the received reference signals 345. In particular, the UE 115-a may perform measurements for CSI-RSs received in accordance with a multiple beamforming configurations 310. The measurements may include, but are not limited to, reference signal received power (RSRP) measurements, reference signal received quality (RSRQ) measurements, received signal strength indicator (RSSI) measurements, channel quality indicator (CQI) measurements, SNR measurements, SINR measurements, or any combination thereof. In other words, the UE 115-a may be configured to perform measurements to evaluate a relative performance of the respective beams/beamforming configurations 310 for communicating with the network entity 105-a.

The UE 115-a may transmit, to the network entity 105-a, a beam report 350 indicating one or more beamforming configurations 310 associated with the CRI. For example, the beam report 350 may indicate the first beamforming configuration 310-a and the second beamforming configuration 310-b associated with the CRI. In other words, the beam report 350 may indicate the first beamforming configuration 310-a associated with a freespace state at the UE 115-a, and the second beamforming configuration 310-b associated with a blockage/obstructed state at the UE 115-a.

In additional or alternative implementations, the UE 115-c may be enabled or configured to report multiple (e.g., three or more) beamforming configurations 310 for a single CRI. Moreover, in other cases, the UE 115-a may be configured with multiple CRIs (e.g., the control signaling 340 may indicate multiple CRIs), and the beam report 350 may indicate one beamforming configuration 310 for each of the respective CRIs.

In some cases, the beam report 350 may indicate respective devices or components of the UE 115-a that are associated with (e.g., used to form/generate) the respective beamforming configurations 310. For example, the beam report 350 may indicate that the first beamforming configuration 310-a is associated with the at least one antenna module 315, and may further indicate that the second beamforming configuration 310-b is associated with the at least one antenna module 315 and the one or more passive devices 320.

In this regard, the UE 115-a may indicate that the first beamforming configuration 310-a is to be used when the UE 115-a is operating in a freespace or unobstructed state, and that the second beamforming configuration 310-b is to be used when the UE 115-a is operating in a blockage or obstructed state.

Once this feedback is received, the network entity 105-b may be configured to send information over the indicated set of K beams/beamforming configurations 310 for enhanced beamforming transmission. For example, the UE 115-a and the network entity 105-a may communicate one or more messages with one another in accordance with the first beamforming configuration 310-a, the second beamforming configuration 310-b, or both.

In some cases, the UE 115-a may transmit a message indicating an operational state of the UE 115-a. In other words, the UE 115-a may indicate whether it is operating in a freespace state, or whether the UE 115-a is operating in a blockage/obstructed state. For example, the UE 115-a may determine that the UE 115-a is operating in a blockage/obstructed state based on detecting a degradation of performance of the first beamforming configuration 310-a, and may transmit a message indicating the blockage/obstructed state. Additionally, or alternatively, the network entity 105-a may be configured to determine that the UE 115-a is operating in the blockage/obstructed state based on performing measurements on the communications received from the UE 115-a.

In this example, the UE 115-a and the network entity 105-a may then communicate one or more messages with one another in accordance with the second beamforming configuration 310-b associated with the blockage/obstructed state. In particular, the devices may communicate with one another in accordance with the second beamforming configuration 310-b based on transmitting/receiving the message indicating the blockage/obstructed state of the UE 115-a.

Techniques described herein may enable the UE 115-a to report multiple beams/beamforming configurations 310 to the network, including beamforming configurations 310 formed using antenna modules (e.g., beamforming configurations 310 for a freespace state) and beamforming configurations 310 formed using both antenna modules and passive devices (e.g., beamforming configurations 310 for an obstructed state). In particular, techniques described herein may enable the UE 115-a to report multiple beamforming configurations 310 for a single CRI, or to be configured with multiple CRIs to enable the UE 115-a to report multiple beamforming configurations 310. By enabling the UE 115-a to report multiple beamforming configurations 310 (e.g., for a single CRI), techniques described herein may enable the UE 115-a to report beamforming configurations 310 usable in both obstructed and unobstructed states, thereby increasing the utility of passive devices at the UE 115-a. Moreover, by enabling the UE 115-a to report multiple beamforming configurations 310, techniques described herein may improve an efficiency and reliability of wireless communications by enabling the UE 115-a to switch between beamforming configurations 310 when a reported beamforming configuration 310 becomes obstructed or otherwise experiences performance degradation.

Figure 4:
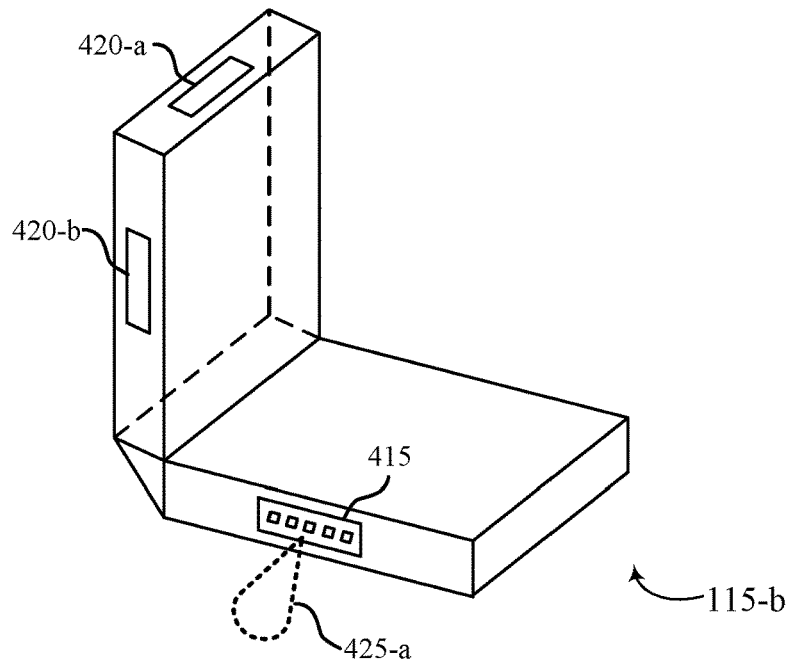
FIG. 4 illustrates an example of a foldable state diagram that supports techniques for beamforming reporting using active IRS configurations in accordance with one or more aspects of the present disclosure.
Figure 4:
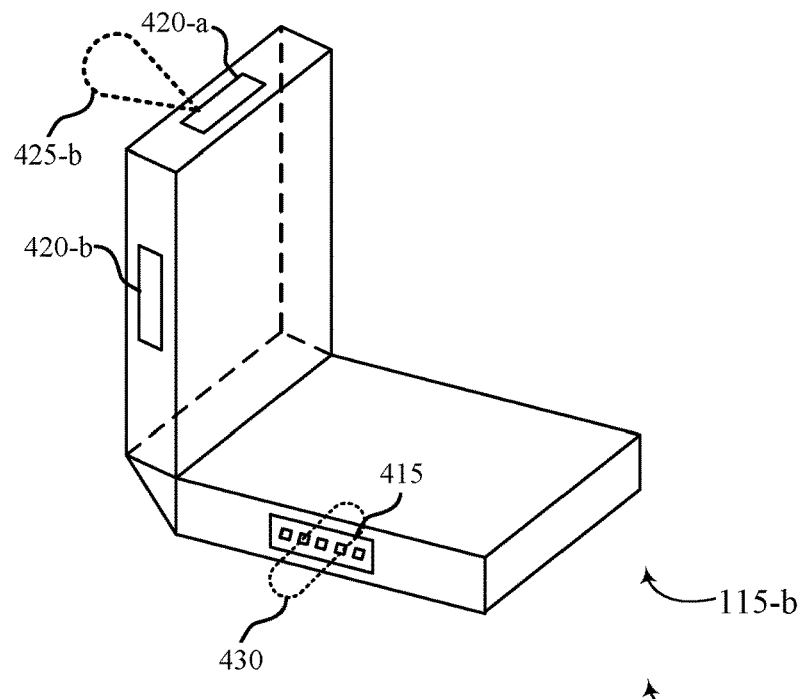

FIG. 4 illustrates an example of a foldable state diagram 400 that supports techniques for beamforming reporting using active IRS configurations in accordance with one or more aspects of the present disclosure. Aspects of the foldable state diagram 400 may implement, or be implemented by, aspects of wireless communications system 100, the network architecture 200, the wireless communications system 300, or any combination thereof. For example, the foldable state diagram 400 illustrates how passive devices 420 may be used to form/generate different beamforming configurations 410 based on the relative foldable state of a UE 115-b.

The foldable state diagram 400 illustrates a UE 115-b that can be operated or configured in multiple foldable states (e.g., "flippable states"). The UE 115-b may include one or more antenna modules 415, and one or more passive devices 420 that are used to form beams/beamforming configurations 410 at the UE 115-b. The ability to operate the UE 115-b according to multiple foldable states may result in complications due to the fact that the different foldable states may result in different relative orientations of antenna modules 415. In this regard, each distinct foldable state may result in a different arrangement of antenna modules 415 relative to one another, which affects the ability of the UE 115-b to form different beams/beamforming configurations 410 within the respective foldable states. Moreover, spatial and cost constraints limit the quantity of antenna modules 415 within a single UE 115-b.

The inclusion of passive devices 420 may alleviate some of these complications and constraints associated with the multiple foldable states of the UE 115-b. In other words, passive devices 420 may be used to reflect signal energy to/from different regions of the UE 115-b in different foldable states, thereby improving a flexibility of the UE 115-b to form different beams/beamforming configurations 410 in different foldable states, and based on whether or not antenna modules 415 are obstructed or not.

For example, as shown in FIG. 4, a first beamforming configuration 410-a illustrates an example in which the antenna module 415 is operating in freespace, or is not otherwise obstructed. In such cases, the antenna module 415 may be used to transmit/receive signals within a first coverage region 425-a (e.g., first beam) associated with the first beamforming configuration 410-a. In other words, the UE 115-b may communicate with the network entity 105 in accordance with the first beamforming configuration 410-a (e.g., transmit/receive signals within the first coverage region 425-a) in cases where the antenna module 415 is not blocked or obstructed.

Comparatively, referring to the second beamforming configuration 410-b, the antenna module 415 may be blocked or obstructed, such as when a user places their finger 430 over the antenna module 415. In this case, the finger 430 may reflect signal energy to different parts of the sphere (e.g., to different locations relative to the UE 115-b), where the precise direction of the reflection may depend on the location of the antenna module 415, the location/positioning of the finger 430, etc. In such cases, the passive devices 420-a, 420-b may be configured to reflect signal energy to/from the antenna module 415 to transmit/receive signals within additional coverage regions 425-b (e.g., additional beams) of the second beamforming configuration 410-b. That is, the first passive device 420-a may reflect signals received within the second coverage region 425-b off the finger 430 to the antenna module 415. Moreover, signals transmitted by the antenna module 415 may be reflected off the finger 430 and reflected by the first passive device 420-a within the second coverage region 425-b.

Figure 5:
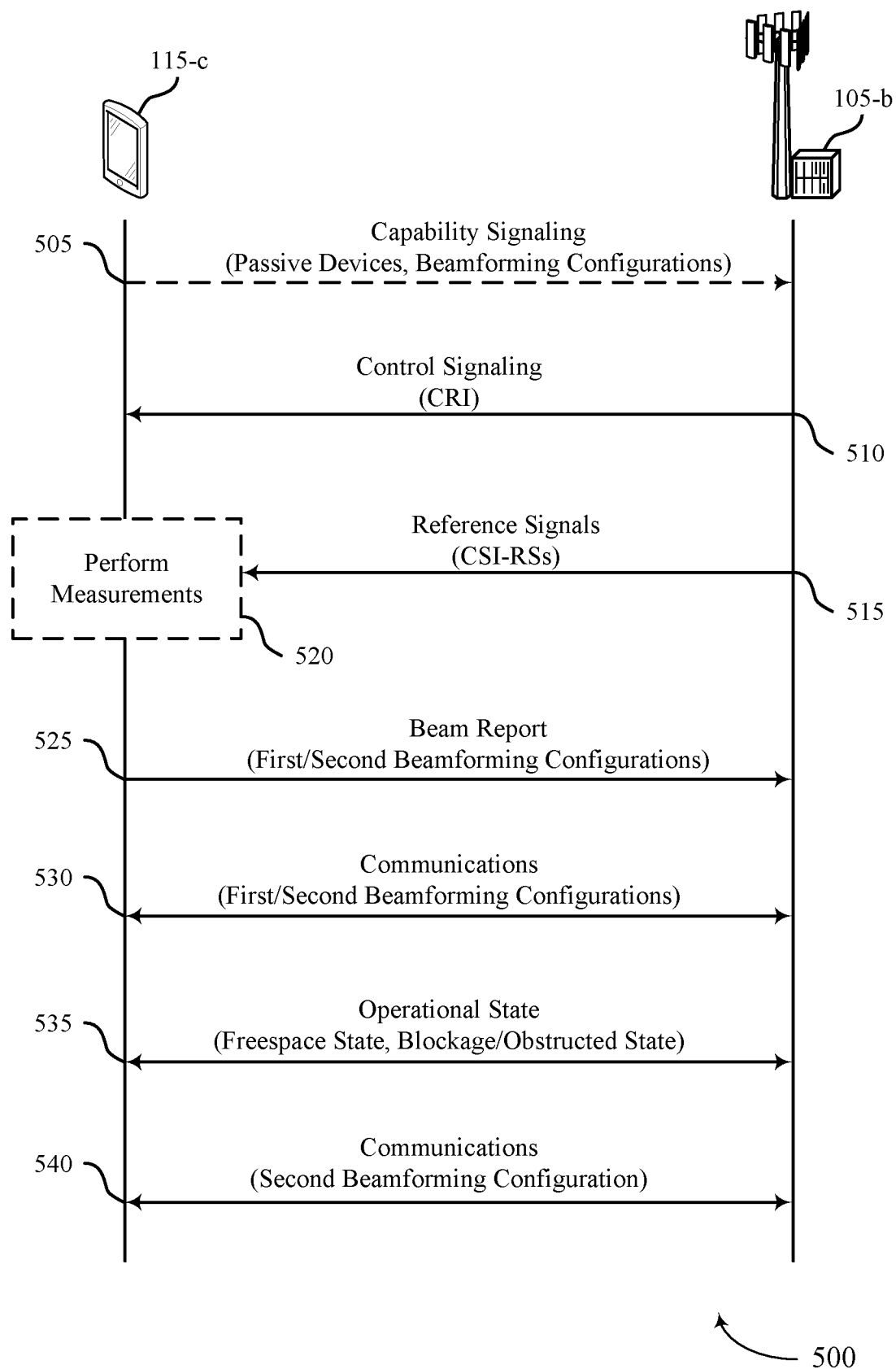
FIG. 5 illustrates an example of a process flow that supports techniques for beamforming reporting using active IRS configurations in accordance with one or more aspects of the present disclosure.

FIG. 5 illustrates an example of a process flow 500 that supports techniques for beamforming reporting using active IRS configurations in accordance with one or more aspects of the present disclosure. Aspects of the process flow 500 may implement, or be implemented by, aspects of wireless communications system 100, the network architecture 200, the wireless communications system 300, the foldable state diagram 400, or any combination thereof. For example, the process flow 500 illustrates signaling that enables a UE 115-c to report multiple beamforming configurations to the network, including beamforming configurations formed using passive devices, as described previously herein.

The process flow 500 includes a UE 115-c and a network entity 105-b, which may be examples of wireless devices as described herein. For example, the UE 115-c and the network entity 105-b illustrated in FIG. 5 may include examples of the UE 115-a and the network entity 105-a, respectively, as illustrated in FIG. 3. While FIG. 5 is described in the context of the UE 115-c and the network entity 105-b, this is solely for illustrative purposes, and is not to be regarded as a limitation of the present disclosure, unless noted otherwise herein. For example, in some cases, the signaling illustrated in FIG. 5 may be exchanged between any two wireless devices, such as between two IAB nodes, between an IAB node and a network entity 105, between a UE 115 and a customer premises equipment (CPE) device, and the like.

In some examples, the operations illustrated in process flow 500 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added.

At 505, the UE 115-c may transmit, to the network entity 105-b, capability signaling indicating a capability of the UE 115-c to apply one or more beamforming configurations using one or more passive devices at the UE 115-c. In other words, the capability signaling may indicate that the UE 115-c includes one or more passive devices that may be used to form beams/beamforming configurations at the UE 115-c, such as in cases were antenna modules at the UE 115-c become obstructed. The passive devices may include (or otherwise emulate properties of) an IRS, RIS, and the like.

At 510, the UE 115-b may receive, from the network entity 105-b, control signaling (e.g., RRC, MAC-CE, SIB) indicating a CRI for beam reporting. The control signaling may indicate a set of resources that are usable for communicating reference signals (e.g., CSI-RSs) associated with the CRI. In some aspects, the UE 115-c may receive the control signaling at 510 based on transmitting the capability signaling at 505.

In some aspects, the control signaling may indicate for the UE 115-c to report a quantity of beamforming configurations associated with the CRI. In other words, the network entity 105-b may configure the UE 115-c to report multiple (e.g., K quantity) beamforming configurations for the single CRI, where the value of K may be configured or indicated via the network (e.g., via the control signaling or additional control signaling). Stated differently, instead of indicating only the best beam/beamforming configuration for the CRI, the network entity 105-b may enable the UE 115-c to report the best set of K beams/beamforming configurations that the network entity 105-b can use to further enhance reception. Such signaling/feedback may be considered as an enhanced P2 procedure and creation of a "multi-beam" in response to device enhancement.

At 515, the network entity 105-b may transmit one or more reference signals, such as CSI-RSs. In particular, the network entity 105-b may transmit the CSI-RSs in accordance with the CRI indicated via the control signaling at 510 (e.g., within resources configured via the control signaling). In this regard, the UE 115-b may receive the reference signals at 515 based on transmitting the capability signaling at 505, receiving the control signaling at 510, or both.

The UE 115-c may be configured to receive the reference signals using multiple different beams/beamforming configurations at the UE 115-c, including beamforming configurations associated with antenna modules at the UE 115-c, passive devices at the UE 115-c, or both. For example, as shown in FIG. 3, the UE 115-c may be configured to receive CSI-RSs using a first beamforming configuration 310-a associated with one or more antenna modules 315 at the UE 115-c, and a second beamforming configuration 310-b associated with the one or more antenna modules 315 and one or more passive devices 320 at the UE 115-c. In this example, the first beamforming configuration 310-a may be associated with freespace state of the one or more antenna modules 315, and the second beamforming configuration 310-b may be associated with a blockage or obstructed state of the one or more antenna modules 315.

At 520, the UE 115-c may perform measurements on the received reference signals. In particular, the UE 115-c may perform measurements (e.g., RSRP, RSRQ, RSSI, CQI, SNR, SINR) for CSI-RSs received in accordance with a multiple beamforming configurations. In other words, the UE 115-c may be configured to perform measurements to evaluate a relative performance of the respective beams/beamforming configurations for communicating with the network entity 105-b. As such, the UE 115-b may perform the measurements at 520 based on transmitting the capability signaling at 505, receiving the control signaling at 510, receiving the reference signals at 515, or any combination thereof.

At 525, the UE 115-c may transmit, to the network entity 105-b, a beam report indicating one or more beamforming configurations associated with the CRI. The UE 115-c may transmit the beam report at 525 based on transmitting the capability signaling at 505, receiving the control signaling at 510, receiving the reference signals at 515, performing the measurements at 520, or any combination thereof.

For example, the beam report may indicate a first beamforming configuration and a second beamforming configuration associated with the CRI, where the first beamforming configuration is associated with at least one antenna module at the UE 115-c, and where the second beamforming configuration is associated with the at least one antenna module and one or more passive devices at the UE 115-c. In other words, the beam report may indicate a first beamforming configuration associated with a freespace state at the UE 115-c, and a second beamforming configuration associated with a blockage/obstructed state at the UE 115-c.

In some cases, the beam report may indicate respective devices or components of the UE 115-c that are associated with (e.g., used to form/generate) the respective beamforming configurations. For example, the beam report may indicate that the first beamforming configuration is associated with the at least one antenna module, and may further indicate that the second beamforming configuration is associated with the at least one antenna module and the one or more passive devices. In this regard, the UE 115-c may indicate that the first beamforming configuration is to be used when the UE 115-c is operating in a freespace or unobstructed state, and that the second beamforming configuration is to be used when the UE 115-c is operating in a blockage or obstructed state.

At 530, the UE 115-c and the network entity 105-b may communicate one or more messages with one another in accordance with the first beamforming configuration, the second beamforming configuration, or both. In this regard, the UE 115-c and the network entity 105-b may communicate with one another at 530 based on transmitting/receiving the capability signaling at 505, receiving/transmitting the control signaling at 510, receiving/transmitting the reference signals at 515, performing the measurements at 520, transmitting/receiving the beam report at 525, or any combination thereof.

At 535, the UE 115-c may transmit a message indicating an operational state of the UE 115-c. In other words, the UE 115-c may indicate whether it is operating in a freespace state, or whether the UE 115-c is operating in a blockage/obstructed state.

For example, the UE 115-c may determine that the UE 115-c is operating in a blockage/obstructed state based on detecting a degradation of performance of the first beamforming configuration 310-a when performing the communications at 535, and may transmit a message indicating the blockage/obstructed state. Additionally, or alternatively, the network entity 105-b may be configured to determine that the UE 115-c is operating in the blockage/obstructed state based on performing measurements on the communications received from the UE 115-c at 530.

At 540, the UE 115-c and the network entity 105-b may communicate one or more messages with one another in accordance with the second beamforming configuration associated with the blockage/obstructed state. In particular, the devices may communicate with one another in accordance with the second beamforming configuration based on transmitting/receiving the message indicating the blockage/obstructed state of the UE 115-c at 535.

Techniques described herein may enable the UE 115-c to report multiple beams/beamforming configurations to the network, including beamforming configurations formed using antenna modules (e.g., beamforming configurations for a freespace state) and beamforming configurations formed using both antenna modules and passive devices (e.g., beamforming configurations for an obstructed state). In particular, techniques described herein may enable the UE 115-c to report multiple beamforming configurations for a single CRI, or to be configured with multiple CRIs to enable the UE 115-c to report multiple beamforming configurations. By enabling the UE 115-c to report multiple beamforming configurations (e.g., for a single CRI), techniques described herein may enable the UE 115-c to report beamforming configurations usable in both obstructed and unobstructed states, thereby increasing the utility of passive devices at the UE 115-c. Moreover, by enabling the UE 115-c to report multiple beamforming configurations, techniques described herein may improve an efficiency and reliability of wireless communications by enabling the UE 115-c to switch between beamforming configurations when a reported beamforming configuration becomes obstructed or otherwise experiences performance degradation.

Figure 6:
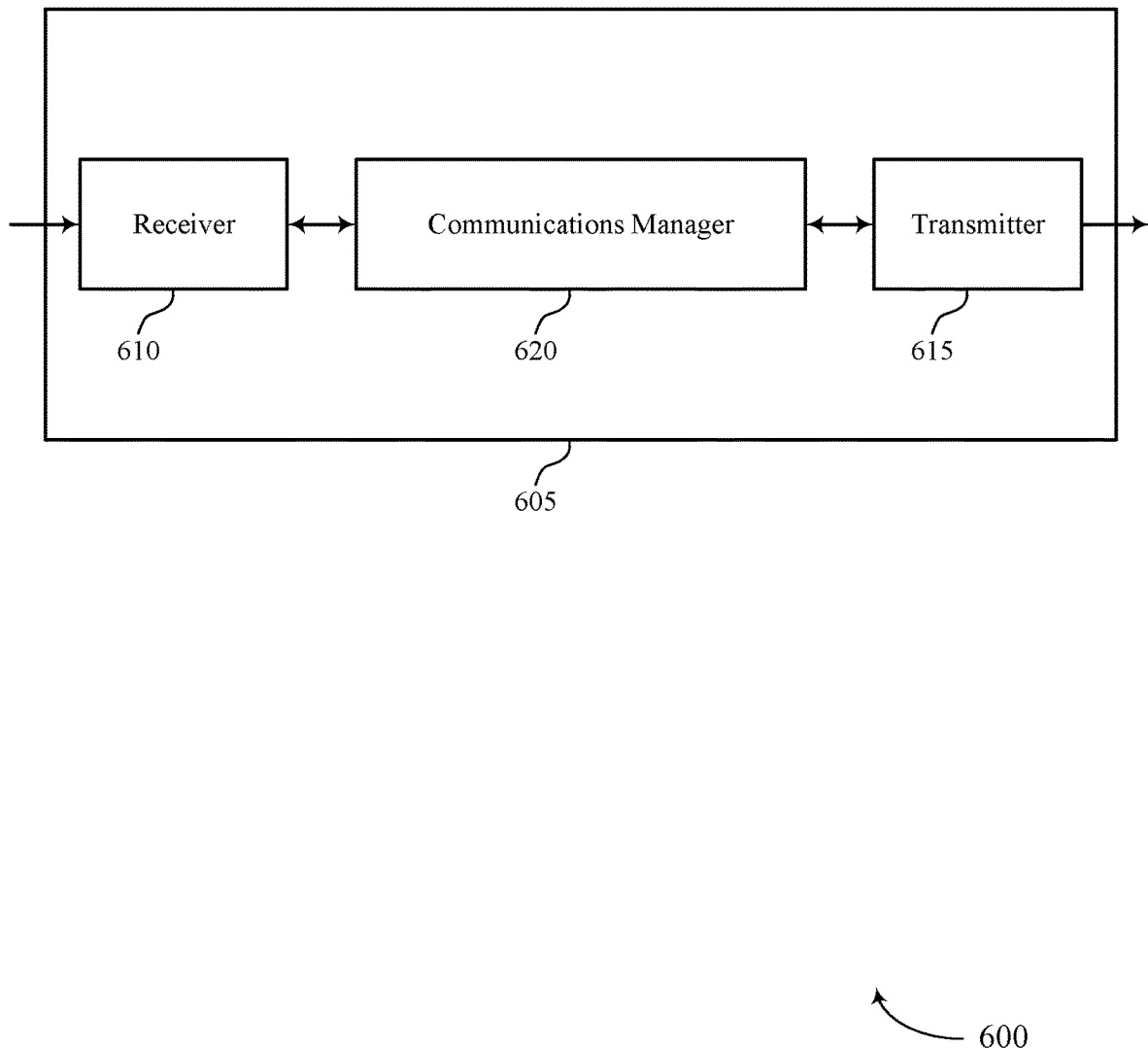
FIGS. 6 and 7 illustrate block diagrams of devices that support techniques for beamforming reporting using active IRS configurations in accordance with one or more aspects of the present disclosure.

FIG. 6 illustrates a block diagram 600 of a device 605 that supports techniques for beamforming reporting using active IRS configurations in accordance with one or more aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for beamforming reporting using active IRS configurations). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for beamforming reporting using active IRS configurations). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of techniques for beamforming reporting using active IRS configurations as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication at a first wireless device in accordance with examples as disclosed herein. For example, the communications manager 620 may be configured as or otherwise support a means for receiving, from a second wireless device, control signaling indicating a CRI for beam reporting. The communications manager 620 may be configured as or otherwise support a means for receiving a set of multiple CSI-RSs in accordance with the CRI. The communications manager 620 may be configured as or otherwise support a means for transmitting, to the second wireless device based on receiving the set of multiple CSI-RSs, a beam report indicating a first beamforming configuration and a second beamforming configuration associated with the CRI, where the first beamforming configuration is associated with at least one antenna module at the first wireless device, and where the second beamforming configuration is associated with the at least one antenna module and one or more passive devices configured to reflect signal energy to or from the at least one antenna module. The communications manager 620 may be configured as or otherwise support a means for communicating one or more messages with the second wireless device in accordance with the first beamforming configuration, the second beamforming configuration, or both.

By including or configuring the communications manager 620 in accordance with examples as described herein, the device 605 (e.g., a processor controlling or otherwise coupled with the receiver 610, the transmitter 615, the communications manager 620, or a combination thereof) may support techniques that enable wireless devices (e.g., UEs 115) to report multiple beams/beamforming configurations to the network, including beamforming configurations formed using antenna modules (e.g., beamforming configurations for a freespace state) and beamforming configurations formed using both antenna modules and passive devices (e.g., beamforming configurations for an obstructed state). In particular, techniques described herein may enable UEs 115 to report multiple beamforming configurations for a single CRI, or to be configured with multiple CRIs to enable the UE 115 to report multiple beamforming configurations. By enabling UEs 115 to report multiple beamforming configurations (e.g., for a single CRI), techniques described herein may enable UEs 115 to report beamforming configurations usable in both obstructed and unobstructed states, thereby increasing the utility of passive devices at the UE 115. Moreover, by enabling UEs 115 to report multiple beamforming configurations, techniques described herein may improve an efficiency and reliability of wireless communications by enabling UEs 115 to switch between beamforming configurations when a reported beamforming configuration becomes obstructed or otherwise experiences performance degradation.

Figure 7:
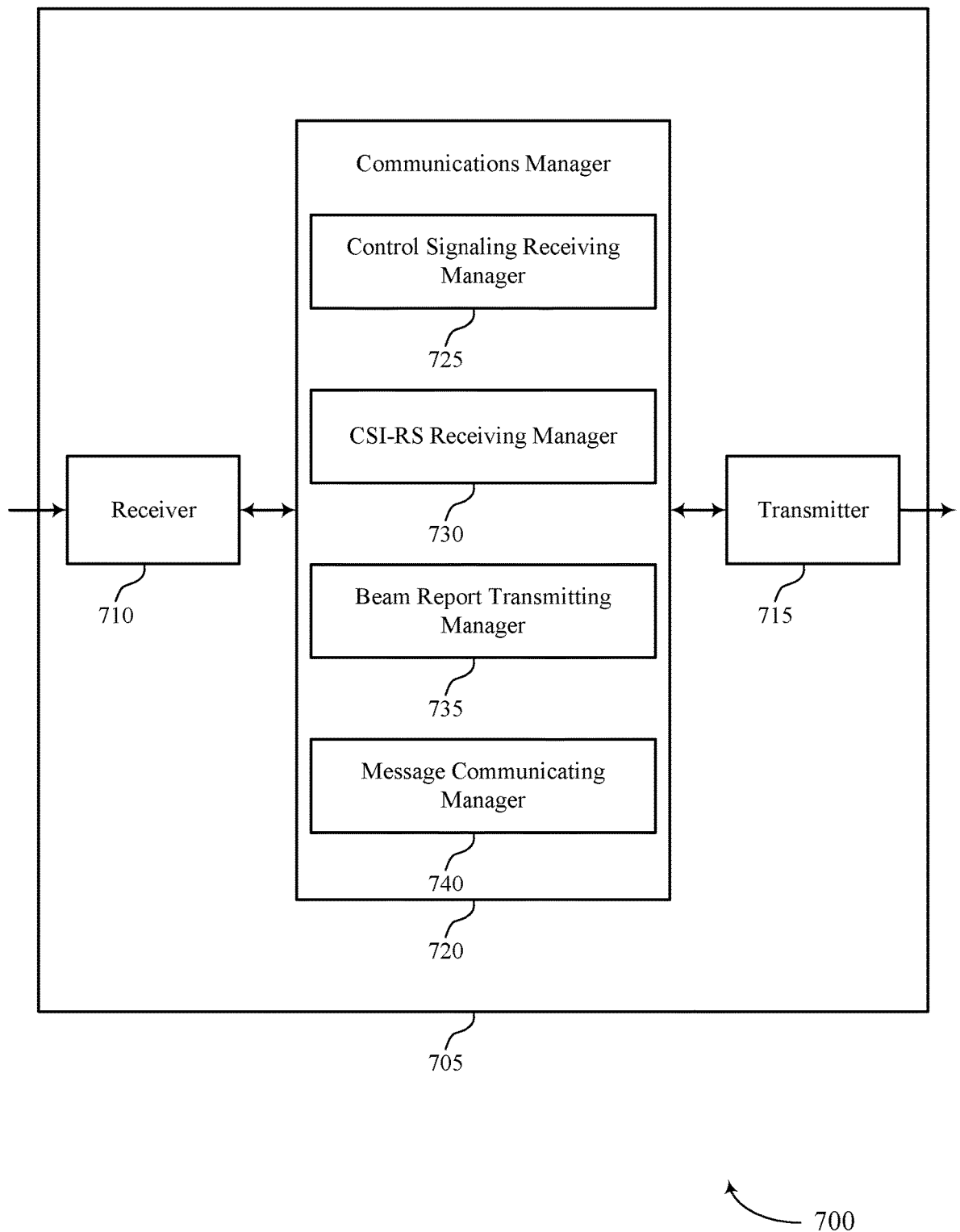

FIG. 7 illustrates a block diagram 700 of a device 705 that supports techniques for beamforming reporting using active IRS configurations in accordance with one or more aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to techniques for beamforming reporting using active IRS configurations). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to techniques for beamforming reporting using active IRS configurations). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of techniques for beamforming reporting using active IRS configurations as described herein. For example, the communications manager 720 may include a control signaling receiving manager 725, a CSI-RS receiving manager 730, a beam report transmitting manager 735, a message communicating manager 740, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communication at a first wireless device in accordance with examples as disclosed herein. The control signaling receiving manager 725 may be configured as or otherwise support a means for receiving, from a second wireless device, control signaling indicating a CRI for beam reporting. The CSI-RS receiving manager 730 may be configured as or otherwise support a means for receiving a set of multiple CSI-RSs in accordance with the CRI. The beam report transmitting manager 735 may be configured as or otherwise support a means for transmitting, to the second wireless device based on receiving the set of multiple CSI-RSs, a beam report indicating a first beamforming configuration and a second beamforming configuration associated with the CRI, where the first beamforming configuration is associated with at least one antenna module at the first wireless device, and where the second beamforming configuration is associated with the at least one antenna module and one or more passive devices configured to reflect signal energy to or from the at least one antenna module. The message communicating manager 740 may be configured as or otherwise support a means for communicating one or more messages with the second wireless device in accordance with the first beamforming configuration, the second beamforming configuration, or both.

Figure 8:
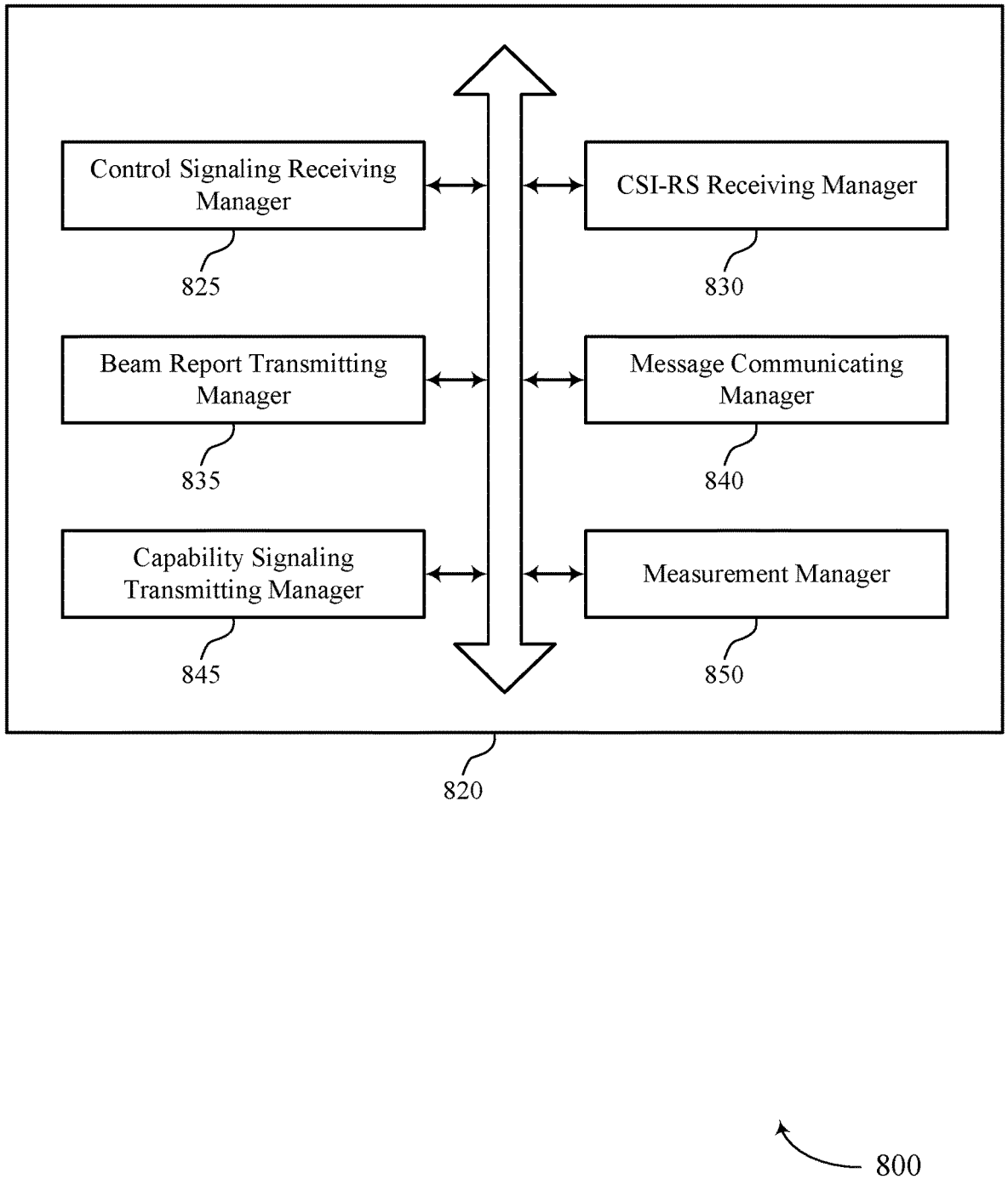
FIG. 8 illustrates a block diagram of a communications manager that supports techniques for beamforming reporting using active IRS configurations in accordance with one or more aspects of the present disclosure.

FIG. 8 illustrates a block diagram 800 of a communications manager 820 that supports techniques for beamforming reporting using active IRS configurations in accordance with one or more aspects of the present disclosure. The communications manager 820 may be an example of aspects of a communications manager 620, a communications manager 720, or both, as described herein. The communications manager 820, or various components thereof, may be an example of means for performing various aspects of techniques for beamforming reporting using active IRS configurations as described herein. For example, the communications manager 820 may include a control signaling receiving manager 825, a CSI-RS receiving manager 830, a beam report transmitting manager 835, a message communicating manager 840, a capability signaling transmitting manager 845, a measurement manager 850, or any combination thereof. Each of these components may communicate, directly or indirectly, with one another (e.g., via one or more buses).

The communications manager 820 may support wireless communication at a first wireless device in accordance with examples as disclosed herein. The control signaling receiving manager 825 may be configured as or otherwise support a means for receiving, from a second wireless device, control signaling indicating a CRI for beam reporting. The CSI-RS receiving manager 830 may be configured as or otherwise support a means for receiving a set of multiple CSI-RSs in accordance with the CRI. The beam report transmitting manager 835 may be configured as or otherwise support a means for transmitting, to the second wireless device based on receiving the set of multiple CSI-RSs, a beam report indicating a first beamforming configuration and a second beamforming configuration associated with the CRI, where the first beamforming configuration is associated with at least one antenna module at the first wireless device, and where the second beamforming configuration is associated with the at least one antenna module and one or more passive devices configured to reflect signal energy to or from the at least one antenna module. The message communicating manager 840 may be configured as or otherwise support a means for communicating one or more messages with the second wireless device in accordance with the first beamforming configuration, the second beamforming configuration, or both.

In some examples, the capability signaling transmitting manager 845 may be configured as or otherwise support a means for transmitting, to the second wireless device, capability signaling indicating a capability of the first wireless device to apply one or more beamforming configurations using the one or more passive devices, where receiving the control signaling, transmitting the beam report indicating the first beamforming configuration and the second beamforming configuration, or both, is based on the capability signaling.

In some examples, the control signaling receiving manager 825 may be configured as or otherwise support a means for receiving, via the control signaling, an indication for the first wireless device to report a quantity of beamforming configurations associated with the CRI, where transmitting the beam report indicating the first beamforming configuration and the second beamforming configuration is based on the indication.

In some examples, the beam report transmitting manager 835 may be configured as or otherwise support a means for transmitting, to the second wireless device via the beam report, an additional message, or both, an indication of the first beamforming configuration or the second beamforming configuration, where the one or more messages are beamformed in accordance with the indication.

In some examples, the measurement manager 850 may be configured as or otherwise support a means for performing measurements for the set of multiple CSI-RSs received in accordance with a set of multiple beamforming configurations, where the set of multiple beamforming configurations include at least the first beamforming configuration and the second beamforming configuration, and where the beam report is based on the measurements.

In some examples, the beam report transmitting manager 835 may be configured as or otherwise support a means for transmitting, via the beam report, a first indication that the first beamforming configuration is associated with the at least one antenna module, and a second indication that the second beamforming configuration is associated with the at least one antenna module and the one or more passive devices.

In some examples, the first beamforming configuration is associated with freespace state of the at least one antenna module. In some examples, the second beamforming configuration is associated with a blockage state of the at least one antenna module. In some examples, the one or more passive devices emulate reflective beam properties of an IRS.

In some examples, the first wireless device includes a UE, an IAB node, or both. In some examples, the second wireless device includes a network entity. In some examples, the one or more passive devices form at least a part of the at least one antenna module.

Figure 9:
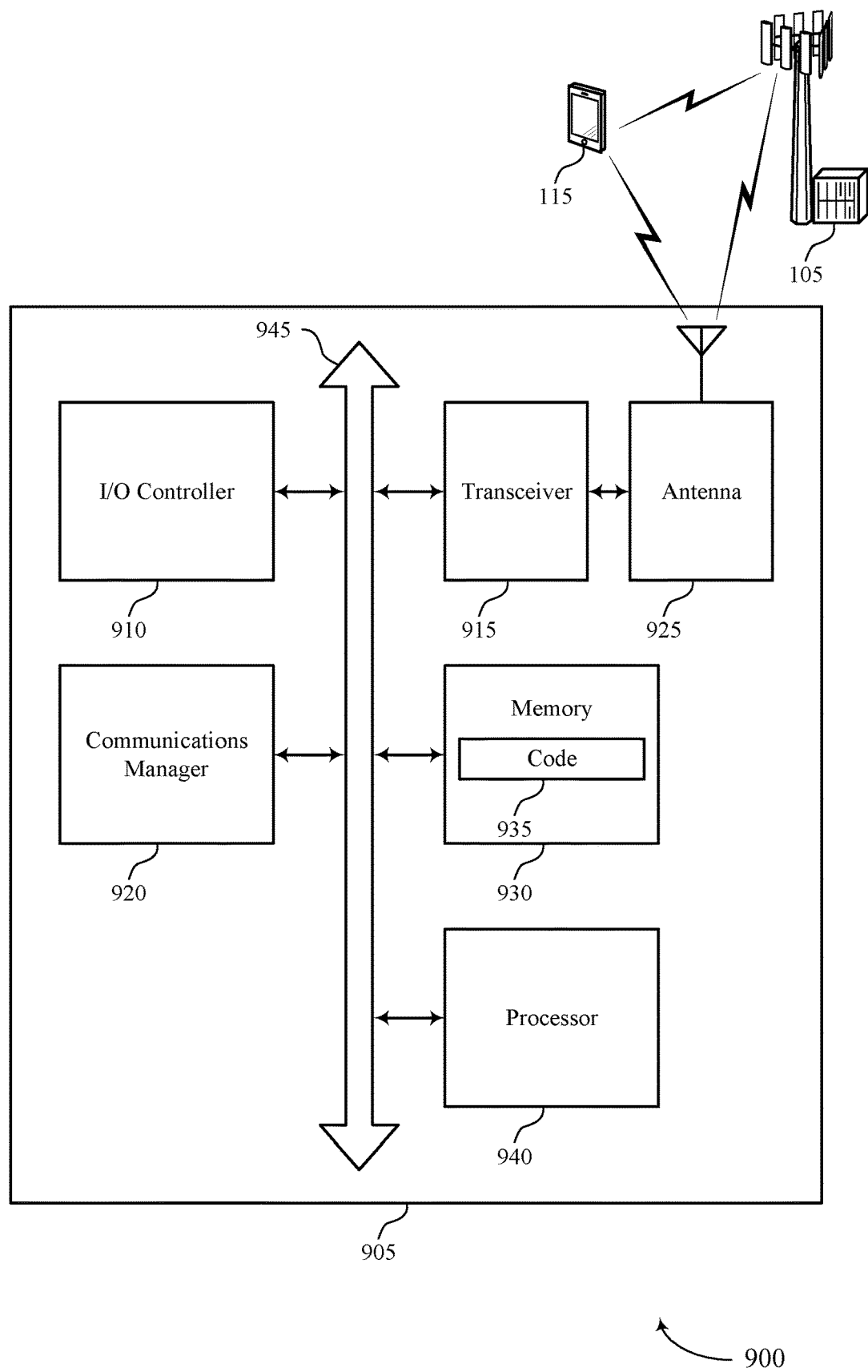
FIG. 9 illustrates a diagram of a system including a device that supports techniques for beamforming reporting using active IRS configurations in accordance with one or more aspects of the present disclosure.

FIG. 9 illustrates a diagram of a system 900 including a device 905 that supports techniques for beamforming reporting using active IRS configurations in accordance with one or more aspects of the present disclosure. The device 905 may be an example of or include the components of a device 605, a device 705, or a UE 115 as described herein. The device 905 may communicate (e.g., wirelessly) with one or more network entities 105, one or more UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting techniques for beamforming reporting using active IRS configurations). For example, the device 905 or a component of the device 905 may include a processor 940 and memory 930 coupled with or to the processor 940, the processor 940 and memory 930 configured to perform various functions described herein.

The communications manager 920 may support wireless communication at a first wireless device in accordance with examples as disclosed herein. For example, the communications manager 920 may be configured as or otherwise support a means for receiving, from a second wireless device, control signaling indicating a CRI for beam reporting. The communications manager 920 may be configured as or otherwise support a means for receiving a set of multiple CSI-RSs in accordance with the CRI. The communications manager 920 may be configured as or otherwise support a means for transmitting, to the second wireless device based on receiving the set of multiple CSI-RSs, a beam report indicating a first beamforming configuration and a second beamforming configuration associated with the CRI, where the first beamforming configuration is associated with at least one antenna module at the first wireless device, and where the second beamforming configuration is associated with the at least one antenna module and one or more passive devices configured to reflect signal energy to or from the at least one antenna module. The communications manager 920 may be configured as or otherwise support a means for communicating one or more messages with the second wireless device in accordance with the first beamforming configuration, the second beamforming configuration, or both.

By including or configuring the communications manager 920 in accordance with examples as described herein, the device 905 may support techniques that enable wireless devices (e.g., UEs 115) to report multiple beams/beamforming configurations to the network, including beamforming configurations formed using antenna modules (e.g., beamforming configurations for a freespace state) and beamforming configurations formed using both antenna modules and passive devices (e.g., beamforming configurations for an obstructed state). In particular, techniques described herein may enable UEs 115 to report multiple beamforming configurations for a single CRI, or to be configured with multiple CRIs to enable the UE 115 to report multiple beamforming configurations. By enabling UEs 115 to report multiple beamforming configurations (e.g., for a single CRI), techniques described herein may enable UEs 115 to report beamforming configurations usable in both obstructed and unobstructed states, thereby increasing the utility of passive devices at the UE 115. Moreover, by enabling UEs 115 to report multiple beamforming configurations, techniques described herein may improve an efficiency and reliability of wireless communications by enabling UEs 115 to switch between beamforming configurations when a reported beamforming configuration becomes obstructed or otherwise experiences performance degradation.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of techniques for beamforming reporting using active IRS configurations as described herein, or the processor 940 and the memory 930 may be otherwise configured to perform or support such operations.

Figure 10:
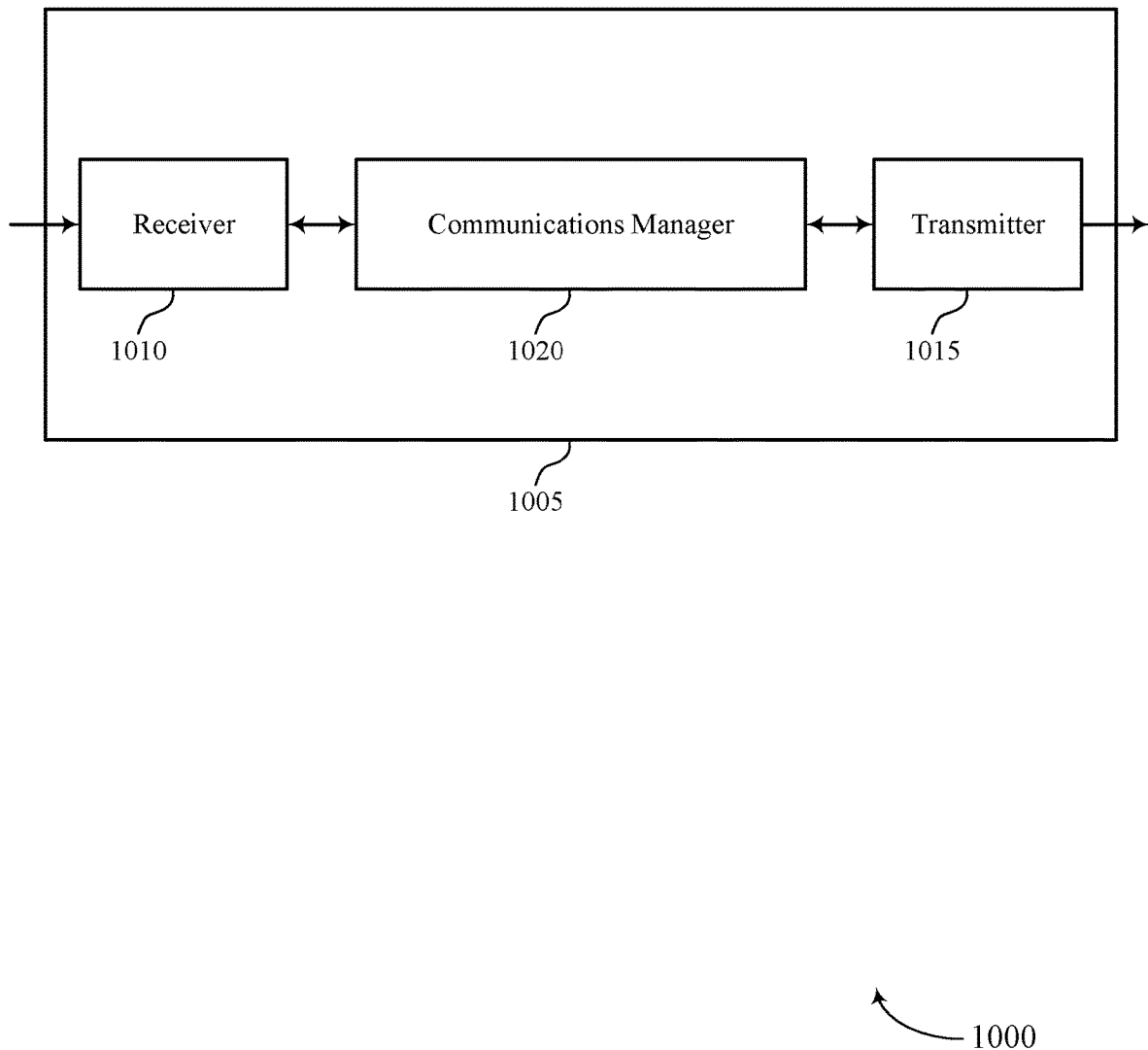
FIGS. 10 and 11 illustrate block diagrams of devices that support techniques for beamforming reporting using active IRS configurations in accordance with one or more aspects of the present disclosure.

FIG. 10 illustrates a block diagram 1000 of a device 1005 that supports techniques for beamforming reporting using active IRS configurations in accordance with one or more aspects of the present disclosure. The device 1005 may be an example of aspects of a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The communications manager 1020, the receiver 1010, the transmitter 1015, or various combinations thereof or various components thereof may be examples of means for performing various aspects of techniques for beamforming reporting using active IRS configurations as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication at a second wireless device in accordance with examples as disclosed herein. For example, the communications manager 1020 may be configured as or otherwise support a means for transmitting, to a first wireless device, control signaling indicating a CRI for beam reporting. The communications manager 1020 may be configured as or otherwise support a means for transmitting a set of multiple CSI-RSs in accordance with the CRI. The communications manager 1020 may be configured as or otherwise support a means for receiving, from the first wireless device based on transmitting the set of multiple CSI-RSs, a beam report indicating a first beamforming configuration and a second beamforming configuration associated with the CRI, where the first beamforming configuration is associated with at least one antenna module at the first wireless device, and where the second beamforming configuration is associated with the at least one antenna module and one or more passive devices configured to reflect signal energy to or from the at least one antenna module. The communications manager 1020 may be configured as or otherwise support a means for communicating one or more messages with the first wireless device in accordance with the first beamforming configuration, the second beamforming configuration, or both.

By including or configuring the communications manager 1020 in accordance with examples as described herein, the device 1005 (e.g., a processor controlling or otherwise coupled with the receiver 1010, the transmitter 1015, the communications manager 1020, or a combination thereof) may support techniques that enable wireless devices (e.g., UEs 115) to report multiple beams/beamforming configurations to the network, including beamforming configurations formed using antenna modules (e.g., beamforming configurations for a freespace state) and beamforming configurations formed using both antenna modules and passive devices (e.g., beamforming configurations for an obstructed state). In particular, techniques described herein may enable UEs 115 to report multiple beamforming configurations for a single CRI, or to be configured with multiple CRIs to enable the UE 115 to report multiple beamforming configurations. By enabling UEs 115 to report multiple beamforming configurations (e.g., for a single CRI), techniques described herein may enable UEs 115 to report beamforming configurations usable in both obstructed and unobstructed states, thereby increasing the utility of passive devices at the UE 115. Moreover, by enabling UEs 115 to report multiple beamforming configurations, techniques described herein may improve an efficiency and reliability of wireless communications by enabling UEs 115 to switch between beamforming configurations when a reported beamforming configuration becomes obstructed or otherwise experiences performance degradation.

Figure 11:
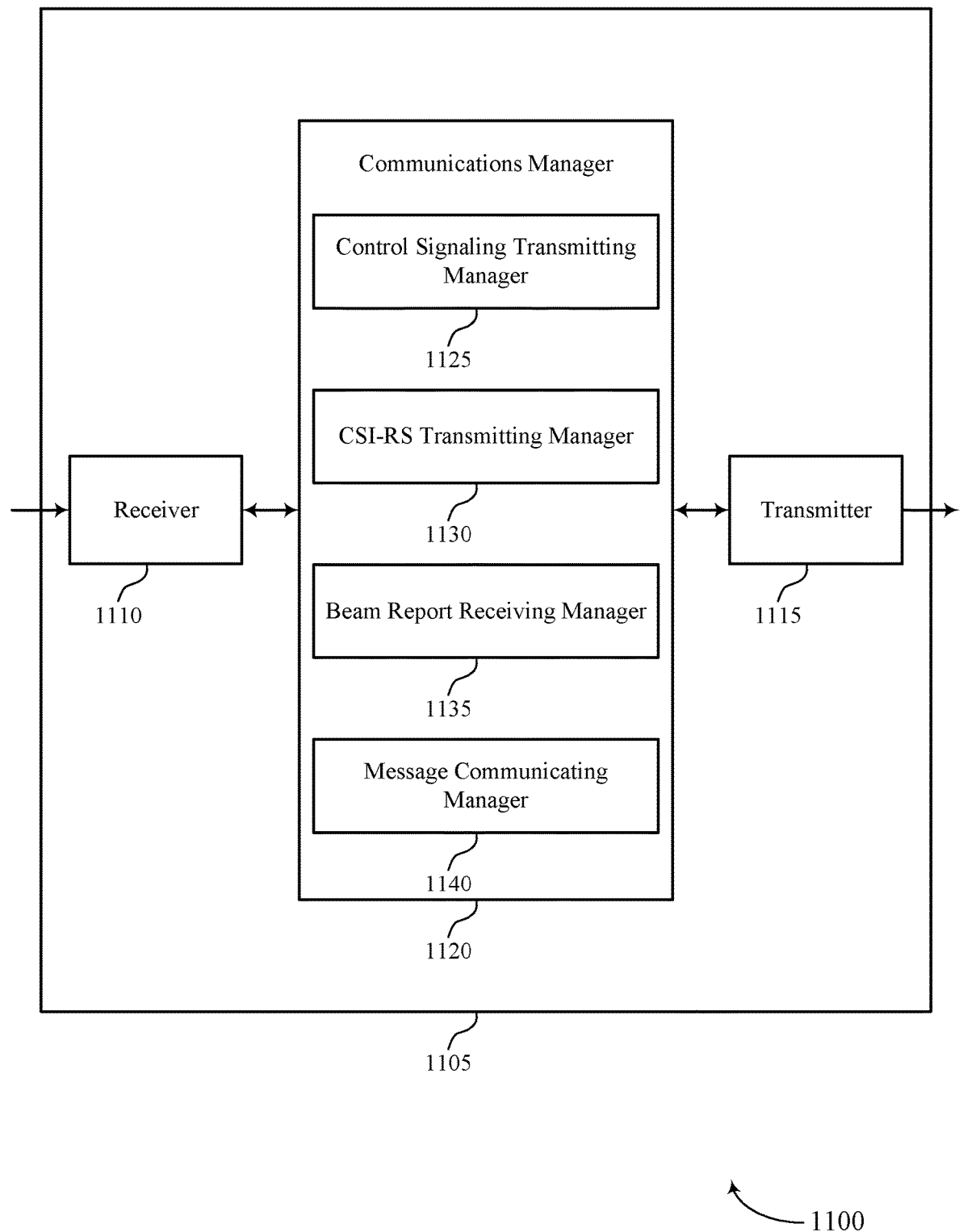

FIG. 11 illustrates a block diagram 1100 of a device 1105 that supports techniques for beamforming reporting using active IRS configurations in accordance with one or more aspects of the present disclosure. The device 1105 may be an example of aspects of a device 1005 or a network entity 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The device 1105, or various components thereof, may be an example of means for performing various aspects of techniques for beamforming reporting using active IRS configurations as described herein. For example, the communications manager 1120 may include a control signaling transmitting manager 1125, a CSI-RS transmitting manager 1130, a beam report receiving manager 1135, a message communicating manager 1140, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communication at a second wireless device in accordance with examples as disclosed herein. The control signaling transmitting manager 1125 may be configured as or otherwise support a means for transmitting, to a first wireless device, control signaling indicating a CRI for beam reporting. The CSI-RS transmitting manager 1130 may be configured as or otherwise support a means for transmitting a set of multiple CSI-RSs in accordance with the CRI. The beam report receiving manager 1135 may be configured as or otherwise support a means for receiving, from the first wireless device based on transmitting the set of multiple CSI-RSs, a beam report indicating a first beamforming configuration and a second beamforming configuration associated with the CRI, where the first beamforming configuration is associated with at least one antenna module at the first wireless device, and where the second beamforming configuration is associated with the at least one antenna module and one or more passive devices configured to reflect signal energy to or from the at least one antenna module. The message communicating manager 1140 may be configured as or otherwise support a means for communicating one or more messages with the first wireless device in accordance with the first beamforming configuration, the second beamforming configuration, or both.

Figure 12:
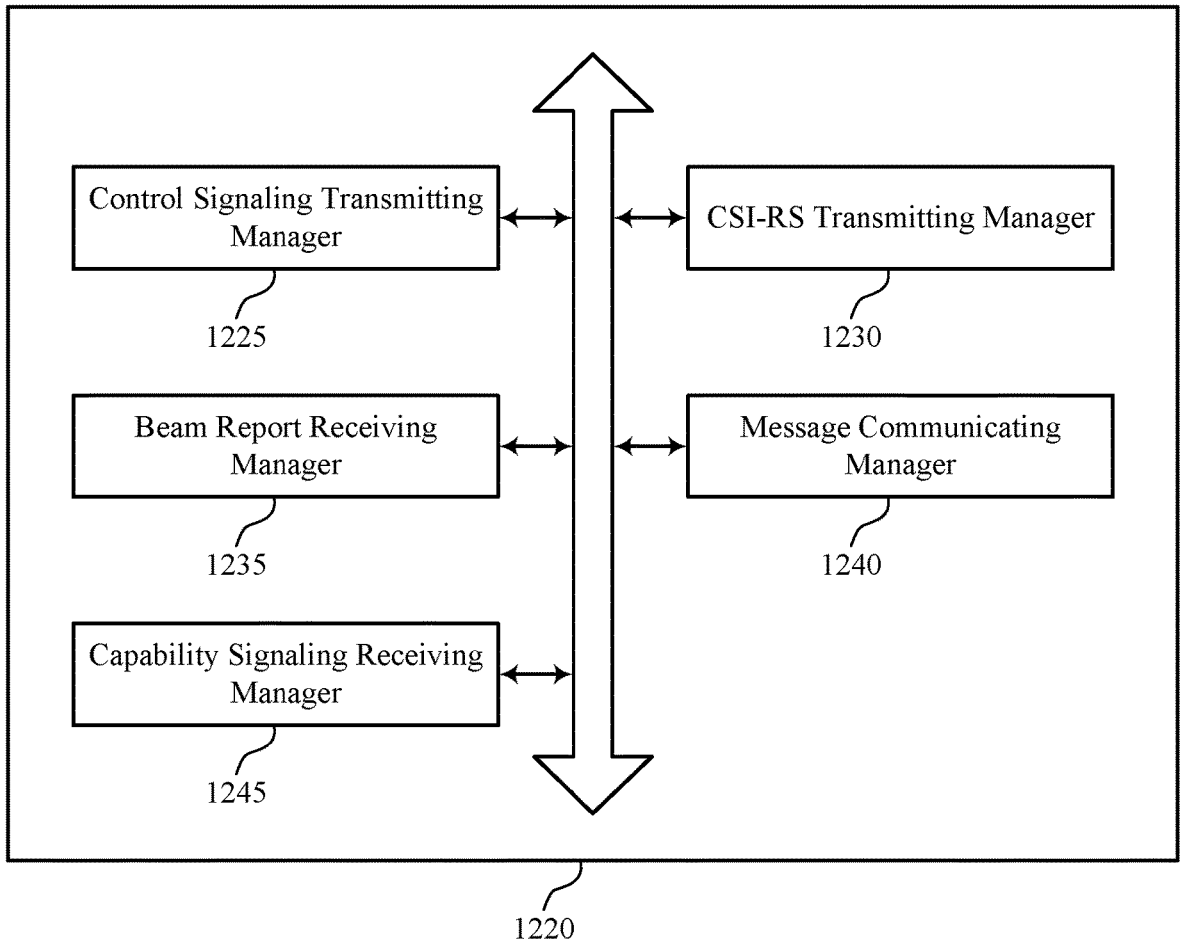
FIG. 12 illustrates a block diagram of a communications manager that supports techniques for beamforming reporting using active IRS configurations in accordance with one or more aspects of the present disclosure.

FIG. 12 illustrates a block diagram 1200 of a communications manager 1220 that supports techniques for beamforming reporting using active IRS configurations in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of techniques for beamforming reporting using active IRS configurations as described herein. For example, the communications manager 1220 may include a control signaling transmitting manager 1225, a CSI-RS transmitting manager 1230, a beam report receiving manager 1235, a message communicating manager 1240, a capability signaling receiving manager 1245, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1220 may support wireless communication at a second wireless device in accordance with examples as disclosed herein. The control signaling transmitting manager 1225 may be configured as or otherwise support a means for transmitting, to a first wireless device, control signaling indicating a CRI for beam reporting. The CSI-RS transmitting manager 1230 may be configured as or otherwise support a means for transmitting a set of multiple CSI-RSs in accordance with the CRI. The beam report receiving manager 1235 may be configured as or otherwise support a means for receiving, from the first wireless device based on transmitting the set of multiple CSI-RSs, a beam report indicating a first beamforming configuration and a second beamforming configuration associated with the CRI, where the first beamforming configuration is associated with at least one antenna module at the first wireless device, and where the second beamforming configuration is associated with the at least one antenna module and one or more passive devices configured to reflect signal energy to or from the at least one antenna module. The message communicating manager 1240 may be configured as or otherwise support a means for communicating one or more messages with the first wireless device in accordance with the first beamforming configuration, the second beamforming configuration, or both.

In some examples, the capability signaling receiving manager 1245 may be configured as or otherwise support a means for receiving, from the first wireless device, capability signaling indicating a capability of the first wireless device to apply one or more beamforming configurations using the one or more passive devices, where transmitting the control signaling, receiving the beam report indicating the first beamforming configuration and the second beamforming configuration, or both, is based on the capability signaling.

In some examples, the control signaling transmitting manager 1225 may be configured as or otherwise support a means for transmitting, via the control signaling, an indication for the first wireless device to report a quantity of beamforming configurations associated with the CRI, where receiving the beam report indicating the first beamforming configuration and the second beamforming configuration is based on the indication.

In some examples, the beam report receiving manager 1235 may be configured as or otherwise support a means for receiving, from the first wireless device via the beam report, an additional message, or both, an indication of the first beamforming configuration or the second beamforming configuration, where the one or more messages are beamformed in accordance with the indication.

In some examples, the beam report receiving manager 1235 may be configured as or otherwise support a means for receiving, via the beam report, a first indication that the first beamforming configuration is associated with the at least one antenna module, and a second indication that the second beamforming configuration is associated with the at least one antenna module and the one or more passive devices.

In some examples, the first beamforming configuration is associated with freespace state of the at least one antenna module. In some examples, the second beamforming configuration is associated with a blockage state of the at least one antenna module. In some examples, the one or more passive devices emulate reflective beam properties of an IRS.

In some examples, the first wireless device includes a UE, an IAB node, or both. In some examples, the second wireless device includes a network entity. In some examples, the one or more passive devices form at least a part of the at least one antenna module.

Figure 13:
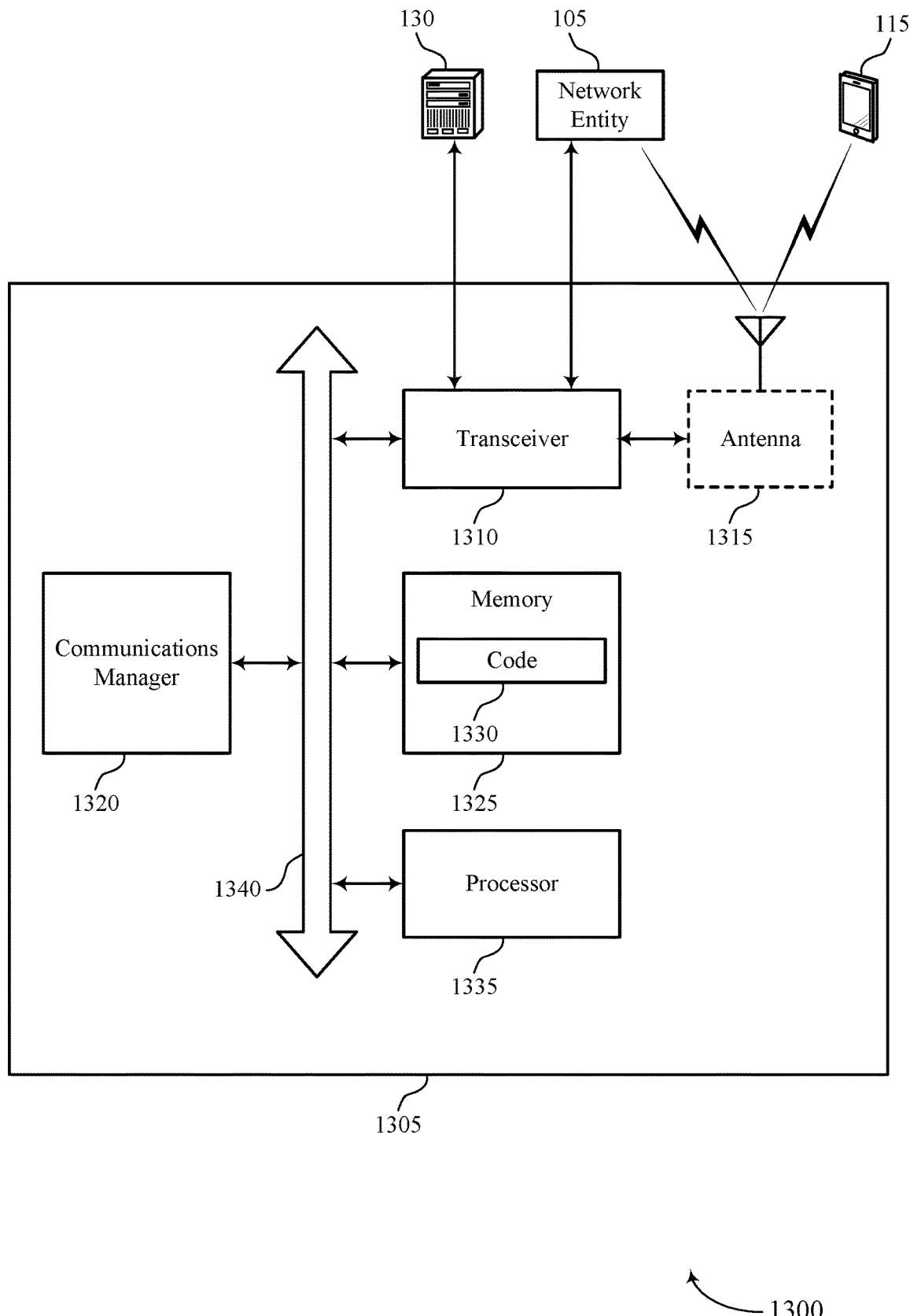
FIG. 13 illustrates a diagram of a system including a device that supports techniques for beamforming reporting using active IRS configurations in accordance with one or more aspects of the present disclosure.

FIG. 13 illustrates a diagram of a system 1300 including a device 1305 that supports techniques for beamforming reporting using active IRS configurations in accordance with one or more aspects of the present disclosure. The device 1305 may be an example of or include the components of a device 1005, a device 1105, or a network entity 105 as described herein. The device 1305 may communicate with one or more network entities 105, one or more UEs 115, or any combination thereof, which may include communications over one or more wired interfaces, over one or more wireless interfaces, or any combination thereof. The device 1305 may include components that support outputting and obtaining communications, such as a communications manager 1320, a transceiver 1310, an antenna 1315, a memory 1325, code 1330, and a processor 1335. These components may be in electronic communication or otherwise coupled (e.g., operatively, communicatively, functionally, electronically, electrically) via one or more buses (e.g., a bus 1340).

The transceiver 1310 may support bi-directional communications via wired links, wireless links, or both as described herein. In some examples, the transceiver 1310 may include a wired transceiver and may communicate bi-directionally with another wired transceiver. Additionally, or alternatively, in some examples, the transceiver 1310 may include a wireless transceiver and may communicate bi-directionally with another wireless transceiver. In some examples, the device 1305 may include one or more antennas 1315, which may be capable of transmitting or receiving wireless transmissions (e.g., concurrently). The transceiver 1310 may also include a modem to modulate signals, to provide the modulated signals for transmission (e.g., by one or more antennas 1315, by a wired transmitter), to receive modulated signals (e.g., from one or more antennas 1315, from a wired receiver), and to demodulate signals. In some implementations, the transceiver 1310 may include one or more interfaces, such as one or more interfaces coupled with the one or more antennas 1315 that are configured to support various receiving or obtaining operations, or one or more interfaces coupled with the one or more antennas 1315 that are configured to support various transmitting or outputting operations, or a combination thereof. In some implementations, the transceiver 1310 may include or be configured for coupling with one or more processors or memory components that are operable to perform or support operations based on received or obtained information or signals, or to generate information or other signals for transmission or other outputting, or any combination thereof. In some implementations, the transceiver 1310, or the transceiver 1310 and the one or more antennas 1315, or the transceiver 1310 and the one or more antennas 1315 and one or more processors or memory components (for example, the processor 1335, or the memory 1325, or both), may be included in a chip or chip assembly that is installed in the device 1305. In some examples, the transceiver may be operable to support communications via one or more communications links (e.g., a communication link 125, a backhaul communication link 120, a midhaul communication link 162, a fronthaul communication link 168).

The memory 1325 may include RAM and ROM. The memory 1325 may store computer-readable, computer-executable code 1330 including instructions that, when executed by the processor 1335, cause the device 1305 to perform various functions described herein. The code 1330 may be stored in a non-transitory computer-readable medium such as system memory or another type of memory. In some cases, the code 1330 may not be directly executable by the processor 1335 but may cause a computer (e.g., when compiled and executed) to perform functions described herein. In some cases, the memory 1325 may contain, among other things, a BIOS which may control basic hardware or software operation such as the interaction with peripheral components or devices.

The processor 1335 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1335 may be configured to operate a memory array using a memory controller. In some other cases, a memory controller may be integrated into the processor 1335. The processor 1335 may be configured to execute computer-readable instructions stored in a memory (e.g., the memory 1325) to cause the device 1305 to perform various functions (e.g., functions or tasks supporting techniques for beamforming reporting using active IRS configurations). For example, the device 1305 or a component of the device 1305 may include a processor 1335 and memory 1325 coupled with the processor 1335, the processor 1335 and memory 1325 configured to perform various functions described herein. The processor 1335 may be an example of a cloud-computing platform (e.g., one or more physical nodes and supporting software such as operating systems, virtual machines, or container instances) that may host the functions (e.g., by executing code 1330) to perform the functions of the device 1305. The processor 1335 may be any one or more suitable processors capable of executing scripts or instructions of one or more software programs stored in the device 1305 (such as within the memory 1325). In some implementations, the processor 1335 may be a component of a processing system. A processing system may generally refer to a system or series of machines or components that receives inputs and processes the inputs to produce a set of outputs (which may be passed to other systems or components of, for example, the device 1305). For example, a processing system of the device 1305 may refer to a system including the various other components or subcomponents of the device 1305, such as the processor 1335, or the transceiver 1310, or the communications manager 1320, or other components or combinations of components of the device 1305. The processing system of the device 1305 may interface with other components of the device 1305, and may process information received from other components (such as inputs or signals) or output information to other components. For example, a chip or modem of the device 1305 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1305 may transmit information output from the chip or modem. Additionally, or alternatively, in some implementations, the one or more interfaces may refer to an interface between the processing system of the chip or modem and a receiver, such that the device 1305 may obtain information or signal inputs, and the information may be passed to the processing system. A person having ordinary skill in the art will readily recognize that a first interface also may obtain information or signal inputs, and a second interface also may output information or signal outputs.

In some examples, a bus 1340 may support communications of (e.g., within) a protocol layer of a protocol stack. In some examples, a bus 1340 may support communications associated with a logical channel of a protocol stack (e.g., between protocol layers of a protocol stack), which may include communications performed within a component of the device 1305, or between different components of the device 1305 that may be co-located or located in different locations (e.g., where the device 1305 may refer to a system in which one or more of the communications manager 1320, the transceiver 1310, the memory 1325, the code 1330, and the processor 1335 may be located in one of the different components or divided between different components).

In some examples, the communications manager 1320 may manage aspects of communications with a core network 130 (e.g., via one or more wired or wireless backhaul links). For example, the communications manager 1320 may manage the transfer of data communications for client devices, such as one or more UEs 115. In some examples, the communications manager 1320 may manage communications with other network entities 105, and may include a controller or scheduler for controlling communications with UEs 115 in cooperation with other network entities 105. In some examples, the communications manager 1320 may support an X2 interface within an LTE/LTE-A wireless communications network technology to provide communication between network entities 105.

The communications manager 1320 may support wireless communication at a second wireless device in accordance with examples as disclosed herein. For example, the communications manager 1320 may be configured as or otherwise support a means for transmitting, to a first wireless device, control signaling indicating a CRI for beam reporting. The communications manager 1320 may be configured as or otherwise support a means for transmitting a set of multiple CSI-RSs in accordance with the CRI. The communications manager 1320 may be configured as or otherwise support a means for receiving, from the first wireless device based on transmitting the set of multiple CSI-RSs, a beam report indicating a first beamforming configuration and a second beamforming configuration associated with the CRI, where the first beamforming configuration is associated with at least one antenna module at the first wireless device, and where the second beamforming configuration is associated with the at least one antenna module and one or more passive devices configured to reflect signal energy to or from the at least one antenna module. The communications manager 1320 may be configured as or otherwise support a means for communicating one or more messages with the first wireless device in accordance with the first beamforming configuration, the second beamforming configuration, or both.

By including or configuring the communications manager 1320 in accordance with examples as described herein, the device 1305 may support techniques that enable wireless devices (e.g., UEs 115) to report multiple beams/beamforming configurations to the network, including beamforming configurations formed using antenna modules (e.g., beamforming configurations for a freespace state) and beamforming configurations formed using both antenna modules and passive devices (e.g., beamforming configurations for an obstructed state). In particular, techniques described herein may enable UEs 115 to report multiple beamforming configurations for a single CRI, or to be configured with multiple CRIs to enable the UE 115 to report multiple beamforming configurations. By enabling UEs 115 to report multiple beamforming configurations (e.g., for a single CRI), techniques described herein may enable UEs 115 to report beamforming configurations usable in both obstructed and unobstructed states, thereby increasing the utility of passive devices at the UE 115. Moreover, by enabling UEs 115 to report multiple beamforming configurations, techniques described herein may improve an efficiency and reliability of wireless communications by enabling UEs 115 to switch between beamforming configurations when a reported beamforming configuration becomes obstructed or otherwise experiences performance degradation.

In some examples, the communications manager 1320 may be configured to perform various operations (e.g., receiving, obtaining, monitoring, outputting, transmitting) using or otherwise in cooperation with the transceiver 1310, the one or more antennas 1315 (e.g., where applicable), or any combination thereof. Although the communications manager 1320 is illustrated as a separate component, in some examples, one or more functions described with reference to the communications manager 1320 may be supported by or performed by the transceiver 1310, the processor 1335, the memory 1325, the code 1330, or any combination thereof. For example, the code 1330 may include instructions executable by the processor 1335 to cause the device 1305 to perform various aspects of techniques for beamforming reporting using active IRS configurations as described herein, or the processor 1335 and the memory 1325 may be otherwise configured to perform or support such operations.

Figure 14:
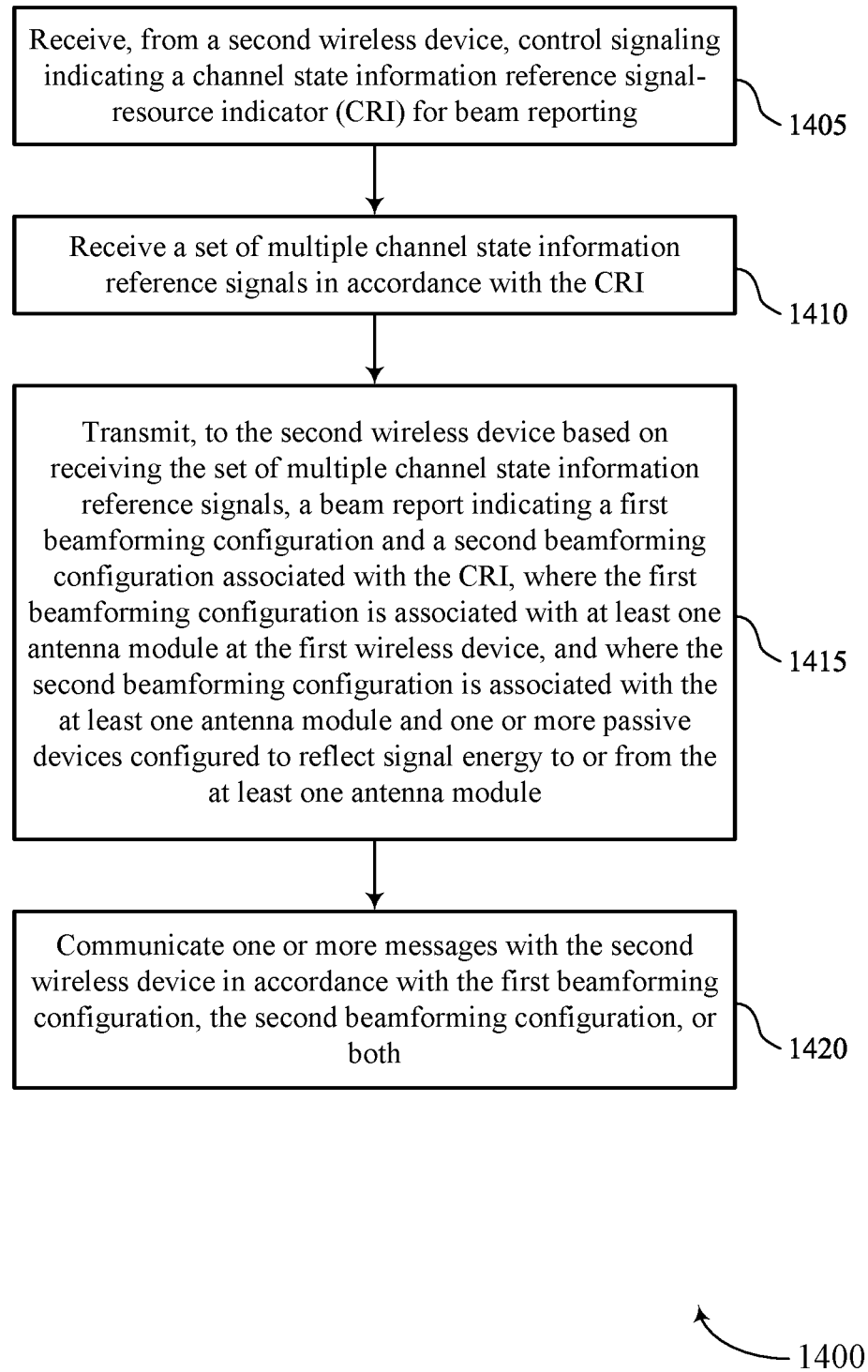
FIGS. 14 through 16 illustrate flowcharts showing methods that support techniques for beamforming reporting using active IRS configurations in accordance with one or more aspects of the present disclosure.

FIG. 14 illustrates a flowchart showing a method 1400 that supports techniques for beamforming reporting using active IRS configurations in accordance with one or more aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1405, the method may include receiving, from a second wireless device, control signaling indicating a CRI for beam reporting. The operations of 1405 may be performed in accordance with examples as disclosed herein. In some examples, aspects of the operations of 1405 may be performed by a control signaling receiving manager 825 as described with reference to FIG. 8.

At 1410, the method may include receiving a set of multiple CSI-RSs in accordance with the CRI. The operations of 1410 may be performed in accordance with examples as disclosed herein. In some examples, aspects of the operations of 1410 may be performed by a CSI-RS receiving manager 830 as described with reference to FIG. 8.

At 1415, the method may include transmitting, to the second wireless device based on receiving the set of multiple CSI-RSs, a beam report indicating a first beamforming configuration and a second beamforming configuration associated with the CRI, where the first beamforming configuration is associated with at least one antenna module at the first wireless device, and where the second beamforming configuration is associated with the at least one antenna module and one or more passive devices configured to reflect signal energy to or from the at least one antenna module. The operations of 1415 may be performed in accordance with examples as disclosed herein. In some examples, aspects of the operations of 1415 may be performed by a beam report transmitting manager 835 as described with reference to FIG. 8.

At 1420, the method may include communicating one or more messages with the second wireless device in accordance with the first beamforming configuration, the second beamforming configuration, or both. The operations of 1420 may be performed in accordance with examples as disclosed herein. In some examples, aspects of the operations of 1420 may be performed by a message communicating manager 840 as described with reference to FIG. 8.

Figure 15:
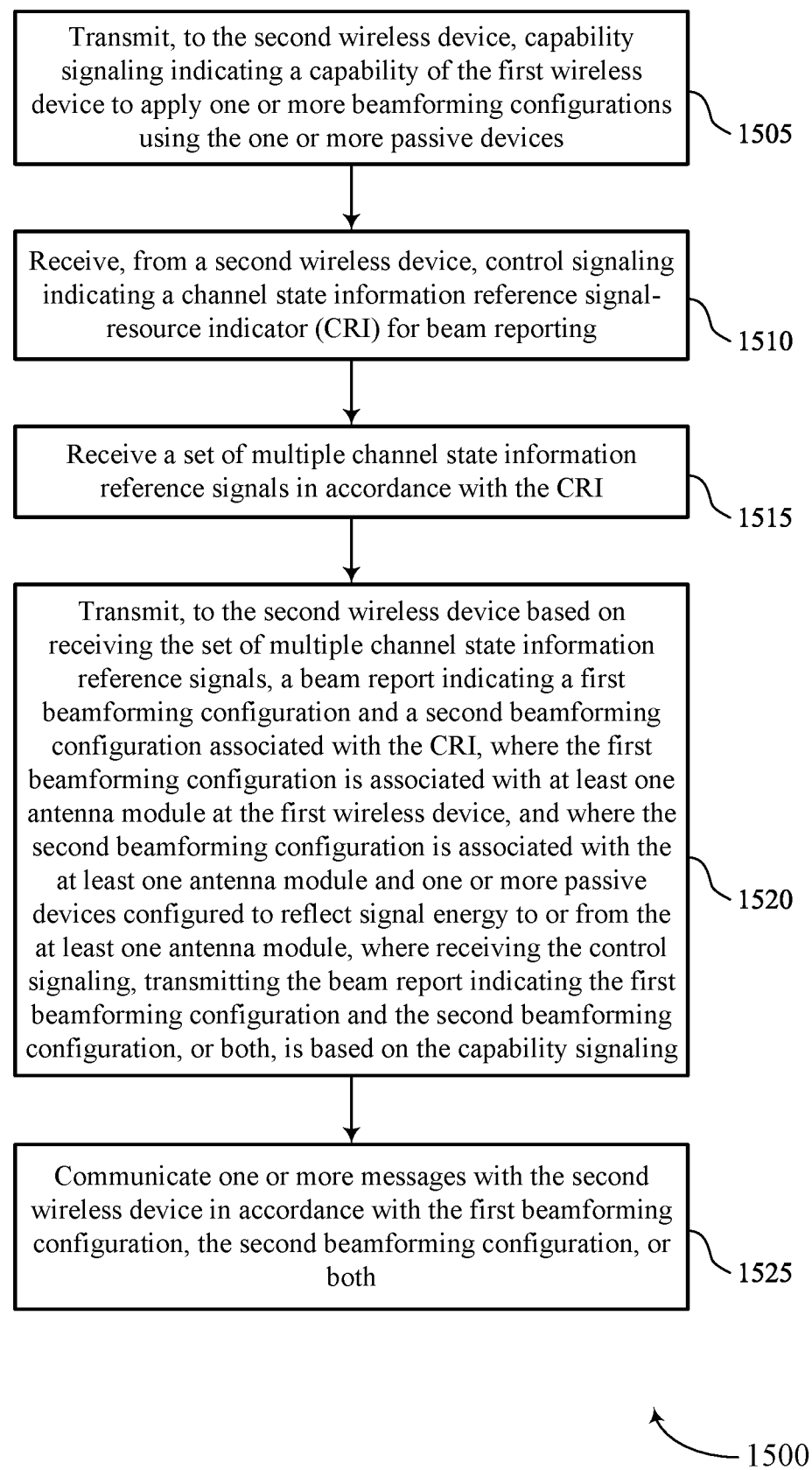

FIG. 15 illustrates a flowchart showing a method 1500 that supports techniques for beamforming reporting using active IRS configurations in accordance with one or more aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1505, the method may include transmitting, to the second wireless device, capability signaling indicating a capability of the first wireless device to apply one or more beamforming configurations using the one or more passive devices. The operations of 1505 may be performed in accordance with examples as disclosed herein. In some examples, aspects of the operations of 1505 may be performed by a capability signaling transmitting manager 845 as described with reference to FIG. 8.

At 1510, the method may include receiving, from a second wireless device, control signaling indicating a CRI for beam reporting. The operations of 1510 may be performed in accordance with examples as disclosed herein. In some examples, aspects of the operations of 1510 may be performed by a control signaling receiving manager 825 as described with reference to FIG. 8.

At 1515, the method may include receiving a set of multiple CSI-RSs in accordance with the CRI. The operations of 1515 may be performed in accordance with examples as disclosed herein. In some examples, aspects of the operations of 1515 may be performed by a CSI-RS receiving manager 830 as described with reference to FIG. 8.

At 1520, the method may include transmitting, to the second wireless device based on receiving the set of multiple CSI-RSs, a beam report indicating a first beamforming configuration and a second beamforming configuration associated with the CRI, where the first beamforming configuration is associated with at least one antenna module at the first wireless device, and where the second beamforming configuration is associated with the at least one antenna module and one or more passive devices configured to reflect signal energy to or from the at least one antenna module, where receiving the control signaling, transmitting the beam report indicating the first beamforming configuration and the second beamforming configuration, or both, is based on the capability signaling. The operations of 1520 may be performed in accordance with examples as disclosed herein. In some examples, aspects of the operations of 1520 may be performed by a beam report transmitting manager 835 as described with reference to FIG. 8.

At 1525, the method may include communicating one or more messages with the second wireless device in accordance with the first beamforming configuration, the second beamforming configuration, or both. The operations of 1525 may be performed in accordance with examples as disclosed herein. In some examples, aspects of the operations of 1525 may be performed by a message communicating manager 840 as described with reference to FIG. 8.

Figure 16:
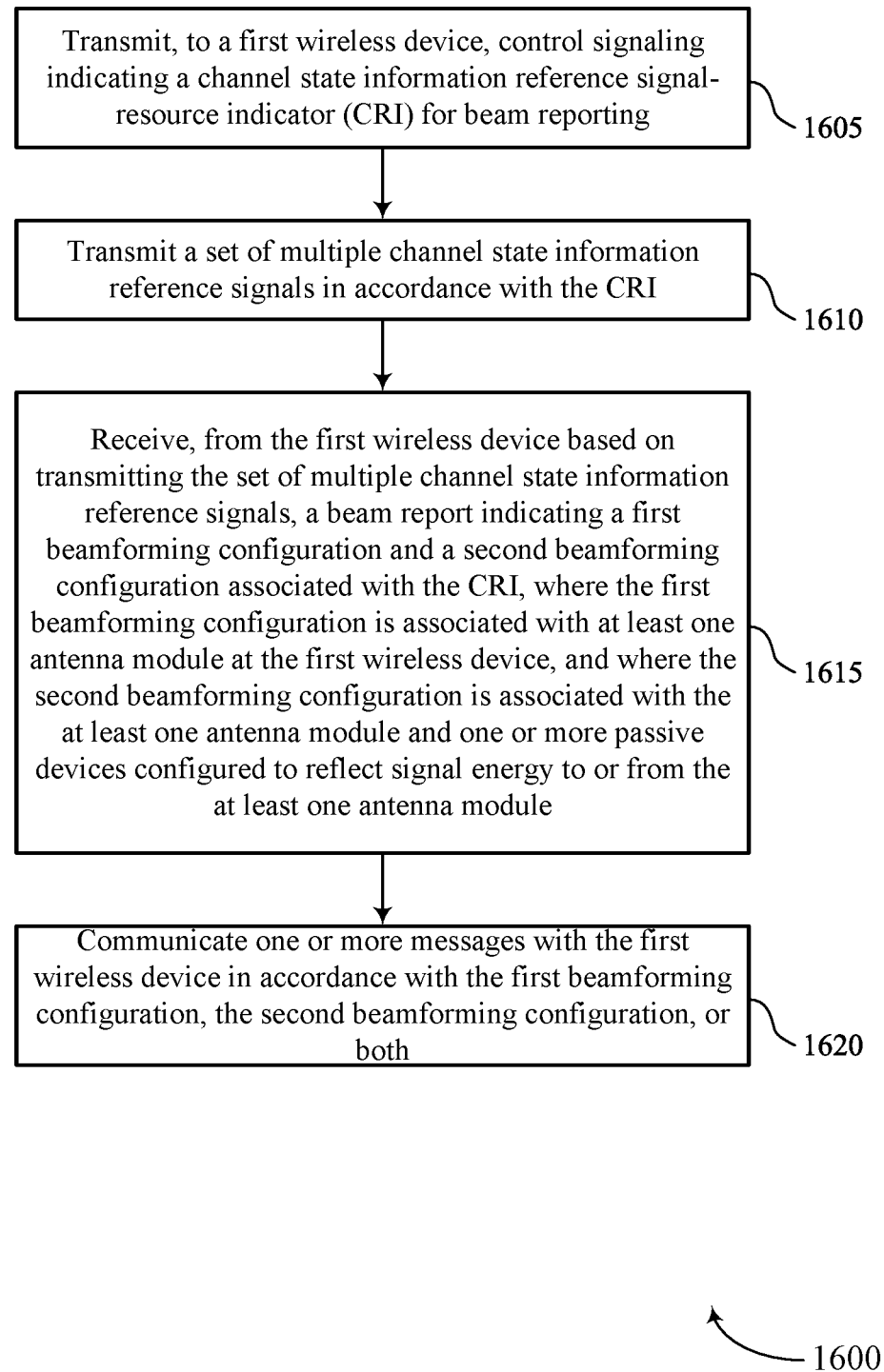

FIG. 16 illustrates a flowchart showing a method 1600 that supports techniques for beamforming reporting using active IRS configurations in accordance with one or more aspects of the present disclosure. The operations of the method 1600 may be implemented by a network entity or its components as described herein. For example, the operations of the method 1600 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1605, the method may include transmitting, to a first wireless device, control signaling indicating a CRI for beam reporting. The operations of 1605 may be performed in accordance with examples as disclosed herein. In some examples, aspects of the operations of 1605 may be performed by a control signaling transmitting manager 1225 as described with reference to FIG. 12.

At 1610, the method may include transmitting a set of multiple CSI-RSs in accordance with the CRI. The operations of 1610 may be performed in accordance with examples as disclosed herein. In some examples, aspects of the operations of 1610 may be performed by a CSI-RS transmitting manager 1230 as described with reference to FIG. 12.

At 1615, the method may include receiving, from the first wireless device based on transmitting the set of multiple CSI-RSs, a beam report indicating a first beamforming configuration and a second beamforming configuration associated with the CRI, where the first beamforming configuration is associated with at least one antenna module at the first wireless device, and where the second beamforming configuration is associated with the at least one antenna module and one or more passive devices configured to reflect signal energy to or from the at least one antenna module. The operations of 1615 may be performed in accordance with examples as disclosed herein. In some examples, aspects of the operations of 1615 may be performed by a beam report receiving manager 1235 as described with reference to FIG. 12.

At 1620, the method may include communicating one or more messages with the first wireless device in accordance with the first beamforming configuration, the second beamforming configuration, or both. The operations of 1620 may be performed in accordance with examples as disclosed herein. In some examples, aspects of the operations of 1620 may be performed by a message communicating manager 1240 as described with reference to FIG. 12.

The following provides an overview of aspects of the present disclosure:

Aspect 1: A method for wireless communication at a first wireless device, comprising: receiving, from a second wireless device, control signaling indicating a CRI for beam reporting; receiving a plurality of CSI-RSs in accordance with the CRI; transmitting, to the second wireless device based at least in part on receiving the plurality of CSI-RSs, a beam report indicating a first beamforming configuration and a second beamforming configuration associated with the CRI, wherein the first beamforming configuration is associated with at least one antenna module at the first wireless device, and wherein the second beamforming configuration is associated with the at least one antenna module and one or more passive devices configured to reflect signal energy to or from the at least one antenna module; and communicating one or more messages with the second wireless device in accordance with the first beamforming configuration, the second beamforming configuration, or both.

Aspect 2: The method of aspect 1, further comprising: transmitting, to the second wireless device, capability signaling indicating a capability of the first wireless device to apply one or more beamforming configurations using the one or more passive devices, wherein receiving the control signaling, transmitting the beam report indicating the first beamforming configuration and the second beamforming configuration, or both, is based at least in part on the capability signaling.

Aspect 3: The method of any of aspects 1 through 2, further comprising: receiving, via the control signaling, an indication for the first wireless device to report a quantity of beamforming configurations associated with the CRI, wherein transmitting the beam report indicating the first beamforming configuration and the second beamforming configuration is based at least in part on the indication.

Aspect 4: The method of any of aspects 1 through 3, further comprising: transmitting, to the second wireless device via the beam report, an additional message, or both, an indication of the first beamforming configuration or the second beamforming configuration, wherein the one or more messages are beamformed in accordance with the indication.

Aspect 5: The method of any of aspects 1 through 4, further comprising: performing measurements for the plurality of CSI-RSs received in accordance with a plurality of beamforming configurations, wherein the plurality of beamforming configurations include at least the first beamforming configuration and the second beamforming configuration, and wherein the beam report is based at least in part on the measurements.

Aspect 6: The method of any of aspects 1 through 5, further comprising: transmitting, via the beam report, a first indication that the first beamforming configuration is associated with the at least one antenna module, and a second indication that the second beamforming configuration is associated with the at least one antenna module and the one or more passive devices.

Aspect 7: The method of any of aspects 1 through 6, wherein the first beamforming configuration is associated with freespace state of the at least one antenna module, and the second beamforming configuration is associated with a blockage state of the at least one antenna module.

Aspect 8: The method of any of aspects 1 through 7, wherein the one or more passive devices emulate reflective beam properties of an IRS.

Aspect 9: The method of any of aspects 1 through 8, wherein the first wireless device comprises a UE, an integrated access and backhaul (IAB) node, or both, and the second wireless device comprises a network entity.

Aspect 10: The method of any of aspects 1 through 9, wherein the one or more passive devices form at least a part of the at least one antenna module.

Aspect 11: A method for wireless communication at a second wireless device, comprising: transmitting, to a first wireless device, control signaling indicating a CRI for beam reporting; transmitting a plurality of CSI-RSs in accordance with the CRI; receiving, from the first wireless device based at least in part on transmitting the plurality of CSI-RSs, a beam report indicating a first beamforming configuration and a second beamforming configuration associated with the CRI, wherein the first beamforming configuration is associated with at least one antenna module at the first wireless device, and wherein the second beamforming configuration is associated with the at least one antenna module and one or more passive devices configured to reflect signal energy to or from the at least one antenna module; and communicating one or more messages with the first wireless device in accordance with the first beamforming configuration, the second beamforming configuration, or both.

Aspect 12: The method of aspect 11, further comprising: receiving, from the first wireless device, capability signaling indicating a capability of the first wireless device to apply one or more beamforming configurations using the one or more passive devices, wherein transmitting the control signaling, receiving the beam report indicating the first beamforming configuration and the second beamforming configuration, or both, is based at least in part on the capability signaling.

Aspect 13: The method of any of aspects 11 through 12, further comprising: transmitting, via the control signaling, an indication for the first wireless device to report a quantity of beamforming configurations associated with the CRI, wherein receiving the beam report indicating the first beamforming configuration and the second beamforming configuration is based at least in part on the indication.

Aspect 14: The method of any of aspects 11 through 13, further comprising: receiving, from the first wireless device via the beam report, an additional message, or both, an indication of the first beamforming configuration or the second beamforming configuration, wherein the one or more messages are beamformed in accordance with the indication.

Aspect 15: The method of any of aspects 11 through 14, further comprising: receiving, via the beam report, a first indication that the first beamforming configuration is associated with the at least one antenna module, and a second indication that the second beamforming configuration is associated with the at least one antenna module and the one or more passive devices.

Aspect 16: The method of any of aspects 11 through 15, wherein the first beamforming configuration is associated with freespace state of the at least one antenna module, and the second beamforming configuration is associated with a blockage state of the at least one antenna module.

Aspect 17: The method of any of aspects 11 through 16, wherein the one or more passive devices emulate reflective beam properties of an IRS.

Aspect 18: The method of any of aspects 11 through 17, wherein the first wireless device comprises a UE, an IAB node, or both, and the second wireless device comprises a network entity.

Aspect 19: The method of any of aspects 11 through 18, wherein the one or more passive devices form at least a part of the at least one antenna module.

Aspect 20: An apparatus for wireless communication at a first wireless device, comprising a processor; memory coupled with the processor; and instructions stored in the memory and executable by the processor to cause the apparatus to perform a method of any of aspects 1 through 10.

Aspect 21: An apparatus for wireless communication at a first wireless device, comprising at least one means for performing a method of any of aspects 1 through 10.

Aspect 22: A non-transitory computer-readable medium storing code for wireless communication at a first wireless device, the code comprising instructions executable by a processor to perform a method of any of aspects 1 through 10.

Aspect 23: An apparatus for wireless communication at a second wireless device, comprising a processor; memory coupled with the processor; and instructions stored in the memory and executable by the processor to cause the apparatus to perform a method of any of aspects 11 through 19.

Aspect 24: An apparatus for wireless communication at a second wireless device, comprising at least one means for performing a method of any of aspects 11 through 19.

Aspect 25: A non-transitory computer-readable medium storing code for wireless communication at a second wireless device, the code comprising instructions executable by a processor to perform a method of any of aspects 11 through 19.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a first wireless device, comprising:
    one or more processors;
    one or more memories coupled with the one or more processors; and
    instructions stored in the one or more memories and executable by the one or more processors to cause the apparatus to:
        receive, from a second wireless device, control signaling indicating a channel state information reference signal-resource indicator (CRI) for beam reporting;
        receive a plurality of channel state information reference signals in accordance with the CRI;
        transmit, to the second wireless device based at least in part on receiving the plurality of channel state information reference signals, a beam report indicating a first beamforming configuration and a second beamforming configuration associated with the CRI, wherein the first beamforming configuration is associated with at least one antenna module at the first wireless device, and wherein the second beamforming configuration is associated with the at least one antenna module and one or more passive devices configured to reflect signal energy to or from the at least one antenna module; and
        communicate one or more messages with the second wireless device in accordance with the first beamforming configuration, the second beamforming configuration, or both.

2. The apparatus of claim 1, wherein the instructions are further executable by the one or more processors to cause the apparatus to:
    transmit, to the second wireless device, capability signaling indicating a capability of the first wireless device to apply one or more beamforming configurations using the one or more passive devices, wherein receiving the control signaling, transmitting the beam report indicating the first beamforming configuration and the second beamforming configuration, or both, is based at least in part on the capability signaling.

3. The apparatus of claim 1, wherein the instructions are further executable by the one or more processors to cause the apparatus to:
    receive, via the control signaling, an indication for the first wireless device to report a quantity of beamforming configurations associated with the CRI, wherein transmitting the beam report indicating the first beamforming configuration and the second beamforming configuration is based at least in part on the indication.

4. The apparatus of claim 1, wherein the instructions are further executable by the one or more processors to cause the apparatus to:
    transmit, to the second wireless device via the beam report, an additional message, or both, an indication of the first beamforming configuration or the second beamforming configuration, wherein the one or more messages are beamformed in accordance with the indication.

5. The apparatus of claim 1, wherein the instructions are further executable by the one or more processors to cause the apparatus to:
    perform measurements for the plurality of channel state information reference signals received in accordance with a plurality of beamforming configurations, wherein the plurality of beamforming configurations include at least the first beamforming configuration and the second beamforming configuration, and wherein the beam report is based at least in part on the measurements.

6. The apparatus of claim 1, wherein the instructions are further executable by the one or more processors to cause the apparatus to:
transmit, via the beam report, a first indication that the first beamforming configuration is associated with the at least one antenna module, and a second indication that the second beamforming configuration is associated with the at least one antenna module and the one or more passive devices.

7. The apparatus of claim 1, wherein the first beamforming configuration is associated with freespace state of the at least one antenna module, and wherein the second beamforming configuration is associated with a blockage state of the at least one antenna module.

8. The apparatus of claim 1, wherein the one or more passive devices emulate reflective beam properties of an intelligent reflective surface.

9. The apparatus of claim 1, wherein the first wireless device comprises a user equipment (UE), an integrated access and backhaul (IAB) node, or both, and wherein the second wireless device comprises a network entity.

10. The apparatus of claim 1, wherein the one or more passive devices form at least a part of the at least one antenna module.

11. An apparatus for wireless communication at a second wireless device, comprising:
one or more processors;
one or more memories coupled with the one or more processors; and
instructions stored in the one or more memories and executable by the one or more processors to cause the apparatus to:
transmit, to a first wireless device, control signaling indicating a channel state information reference signal-resource indicator (CRI) for beam reporting;
transmit a plurality of channel state information reference signals in accordance with the CRI;
receive, from the first wireless device based at least in part on transmitting the plurality of channel state information reference signals, a beam report indicating a first beamforming configuration and a second beamforming configuration associated with the CRI, wherein the first beamforming configuration is associated with at least one antenna module at the first wireless device, and wherein the second beamforming configuration is associated with the at least one antenna module and one or more passive devices configured to reflect signal energy to or from the at least one antenna module; and
communicate one or more messages with the first wireless device in accordance with the first beamforming configuration, the second beamforming configuration, or both.

12. The apparatus of claim 11, wherein the instructions are further executable by the one or more processors to cause the apparatus to:
receive, from the first wireless device, capability signaling indicating a capability of the first wireless device to apply one or more beamforming configurations using the one or more passive devices, wherein transmitting the control signaling, receiving the beam report indicating the first beamforming configuration and the second beamforming configuration, or both, is based at least in part on the capability signaling.

13. The apparatus of claim 11, wherein the instructions are further executable by the one or more processors to cause the apparatus to:
transmit, via the control signaling, an indication for the first wireless device to report a quantity of beamforming configurations associated with the CRI, wherein receiving the beam report indicating the first beamforming configuration and the second beamforming configuration is based at least in part on the indication.

14. The apparatus of claim 11, wherein the instructions are further executable by the one or more processors to cause the apparatus to:
receive, from the first wireless device via the beam report, an additional message, or both, an indication of the first beamforming configuration or the second beamforming configuration, wherein the one or more messages are beamformed in accordance with the indication.

15. The apparatus of claim 11, wherein the instructions are further executable by the one or more processors to cause the apparatus to:
receive, via the beam report, a first indication that the first beamforming configuration is associated with the at least one antenna module, and a second indication that the second beamforming configuration is associated with the at least one antenna module and the one or more passive devices.

16. The apparatus of claim 11, wherein the first beamforming configuration is associated with freespace state of the at least one antenna module, and wherein the second beamforming configuration is associated with a blockage state of the at least one antenna module.

17. The apparatus of claim 11, wherein the one or more passive devices emulate reflective beam properties of an intelligent reflective surface.

18. The apparatus of claim 11, wherein the first wireless device comprises a user equipment (UE), an integrated access and backhaul (IAB) node, or both, and wherein the second wireless device comprises a network entity.

19. The apparatus of claim 11, wherein the one or more passive devices form at least a part of the at least one antenna module.

20. A method for wireless communication at a first wireless device, comprising:
receiving, from a second wireless device, control signaling indicating a channel state information reference signal-resource indicator (CRI) for beam reporting;
receiving a plurality of channel state information reference signals in accordance with the CRI;
transmitting, to the second wireless device based at least in part on receiving the plurality of channel state information reference signals, a beam report indicating a first beamforming configuration and a second beamforming configuration associated with the CRI, wherein the first beamforming configuration is associated with at least one antenna module at the first wireless device, and wherein the second beamforming configuration is associated with the at least one antenna module and one or more passive devices configured to reflect signal energy to or from the at least one antenna module; and
communicating one or more messages with the second wireless device in accordance with the first beamforming configuration, the second beamforming configuration, or both.

21. The method of claim 20, further comprising:
transmitting, to the second wireless device, capability signaling indicating a capability of the first wireless device to apply one or more beamforming configurations using the one or more passive devices, wherein receiving the control signaling, transmitting the beam report indicating the first beamforming configuration and the second beamforming configuration, or both, is based at least in part on the capability signaling.

22. The method of claim 20, further comprising:
receiving, via the control signaling, an indication for the first wireless device to report a quantity of beamforming configurations associated with the CRI, wherein transmitting the beam report indicating the first beamforming configuration and the second beamforming configuration is based at least in part on the indication.

23. The method of claim 20, further comprising:
transmitting, to the second wireless device via the beam report, an additional message, or both, an indication of the first beamforming configuration or the second beamforming configuration, wherein the one or more messages are beamformed in accordance with the indication.

24. The method of claim 20, further comprising:
performing measurements for the plurality of channel state information reference signals received in accordance with a plurality of beamforming configurations, wherein the plurality of beamforming configurations include at least the first beamforming configuration and the second beamforming configuration, and wherein the beam report is based at least in part on the measurements.

25. The method of claim 20, further comprising:
transmitting, via the beam report, a first indication that the first beamforming configuration is associated with the at least one antenna module, and a second indication that the second beamforming configuration is associated with the at least one antenna module and the one or more passive devices.

26. The method of claim 20, wherein:
the first beamforming configuration is associated with freespace state of the at least one antenna module, and
the second beamforming configuration is associated with a blockage state of the at least one antenna module.

27. The method of claim 20, wherein the one or more passive devices emulate reflective beam properties of an intelligent reflective surface.

28. A method for wireless communication at a second wireless device, comprising:

transmitting, to a first wireless device, control signaling indicating a channel state information reference signal-resource indicator (CRI) for beam reporting;

transmitting a plurality of channel state information reference signals in accordance with the CRI;

receiving, from the first wireless device based at least in part on transmitting the plurality of channel state information reference signals, a beam report indicating a first beamforming configuration and a second beamforming configuration associated with the CRI, wherein the first beamforming configuration is associated with at least one antenna module at the first wireless device, and wherein the second beamforming configuration is associated with the at least one antenna module and one or more passive devices configured to reflect signal energy to or from the at least one antenna module; and communicating one or more messages with the first wireless device in accordance with the first beamforming configuration, the second beamforming configuration, or both.

29. The method of claim 28, further comprising:
receiving, from the first wireless device, capability signaling indicating a capability of the first wireless device to apply one or more beamforming configurations using the one or more passive devices, wherein transmitting the control signaling, receiving the beam report indicating the first beamforming configuration and the second beamforming configuration, or both, is based at least in part on the capability signaling.

30. The method of claim 28, further comprising:
transmitting, via the control signaling, an indication for the first wireless device to report a quantity of beamforming configurations associated with the CRI, wherein receiving the beam report indicating the first beamforming configuration and the second beamforming configuration is based at least in part on the indication.

* * * * *